United States Patent [19]

Peck et al.

[11] Patent Number: 5,748,843
[45] Date of Patent: May 5, 1998

[54] APPARATUS AND METHOD FOR VOICE CONTROLLED APPAREL MANUFACTURE

[75] Inventors: John C. Peck, Seneca, S.C.; Randy Rowland, Watkinsville, Ga.; Duanpei Wu, Clemson, S.C.

[73] Assignee: Clemson University, Clemson, S.C.

[21] Appl. No.: 336,290

[22] Filed: Nov. 8, 1994

Related U.S. Application Data

[63] Continuation-in-part of Ser. No. 155,100, Nov. 19, 1993, Pat. No. 5,375,063, which is a continuation of Ser. No. 763,347, Sep. 20, 1991, abandoned.

[51] Int. Cl.$^6$ .................................................. G10L 3/00
[52] U.S. Cl. .................. 395/2.84; 395/2.79; 112/277; 112/112.11; 364/470
[58] Field of Search .......................... 395/2.84, 2.55, 395/2.42; 364/470; 112/277, 112.11

[56] References Cited

U.S. PATENT DOCUMENTS

| | | | |
|---|---|---|---|
| Re. 32,012 | 10/1985 | Pirz et al. | 381/43 |
| 4,100,370 | 7/1978 | Suzuki et al. | 381/42 |
| 4,469,038 | 9/1984 | Fujikawa | 112/277 |
| 4,610,023 | 9/1986 | Noso et al. | 381/43 |
| 4,707,858 | 11/1987 | Fette | 381/43 |
| 4,862,363 | 8/1989 | Krisher | |
| 4,896,357 | 1/1990 | Hatano | |
| 4,922,538 | 5/1990 | Tchorzewski | |
| 5,144,900 | 9/1992 | Takahashi | 112/121.11 |
| 5,199,080 | 3/1993 | Kimura et al. | 381/110 |
| 5,230,023 | 7/1993 | Nakano | 381/110 |
| 5,303,148 | 4/1994 | Mattson et al. | 364/413.01 |
| 5,375,063 | 12/1994 | Peck et al. | 364/470 |
| 5,384,833 | 1/1995 | Cameron | 379/67 |

OTHER PUBLICATIONS

Russell Ito, "Voice Navigator II," MacUser, pp. 48–49, Sep. 1991.

Voice Assisted Sewing Technology presentation at Fourth Annual Academic Apparel Research Conference, Feb. 8–9, 1993.

Advertising Material for Intravoice by Voice Connection, pp. 1–16.

*Primary Examiner*—Allen R. MacDonald
*Assistant Examiner*—Vijay B. Chawan
*Attorney, Agent, or Firm*—Dority & Manning, P.A.

[57] ABSTRACT

Apparatus and method for speech recognition control of apparel manufacture equipment, such as a sewing machine, is provided. The invention includes a device for recognizing and translating an operator's verbal command into a digital control signal; a communication device such as a microphone for inputting the operator's verbal command into the recognizing and translating device; and interfacing means for presenting the digital control signal to the apparel manufacture equipment in a form recognized and accepted by the equipment. The method for voice control of apparel manufacture equipment according to the present invention comprises the steps of receiving an operator's verbal command; recognizing and translating the verbal command into a digital control signal; and routing this digital control signal to the apparel manufacture equipment in a form recognized by an actable upon by the equipment. An infrared light linkage may be employed to transmit commands from an operator to the machine's control circuitry.

45 Claims, 14 Drawing Sheets xyz/s
x--Reset
y--internal data
z--internal clock
s--state

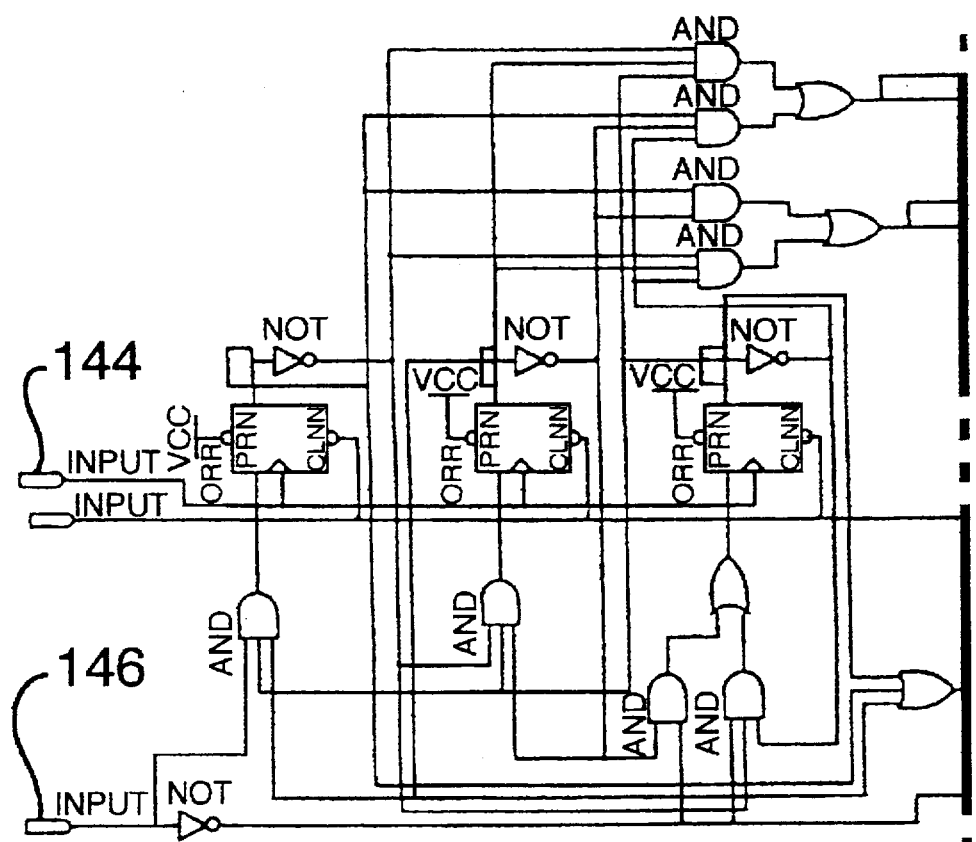
FIG. 8c1

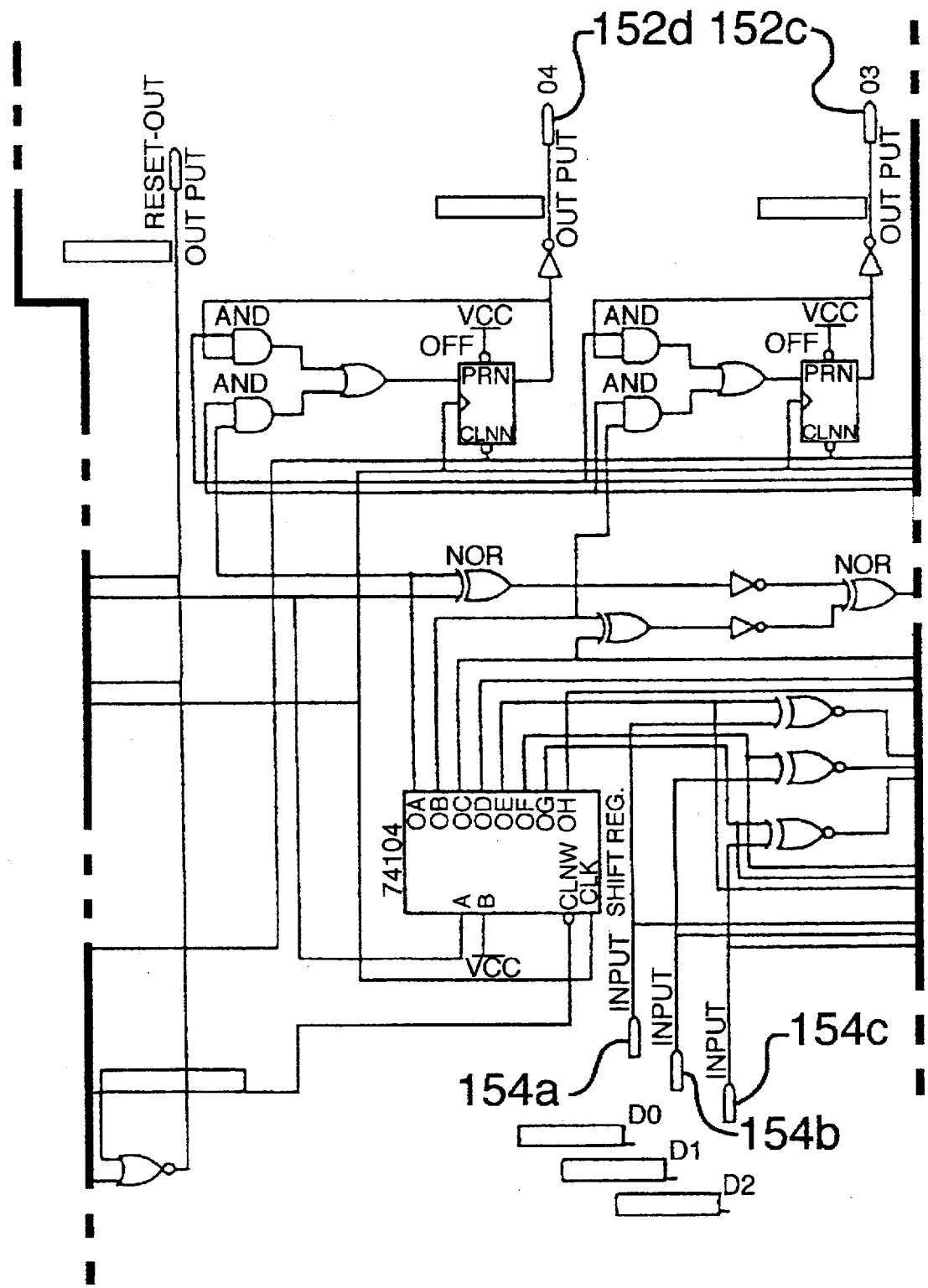
FIG. 8c2

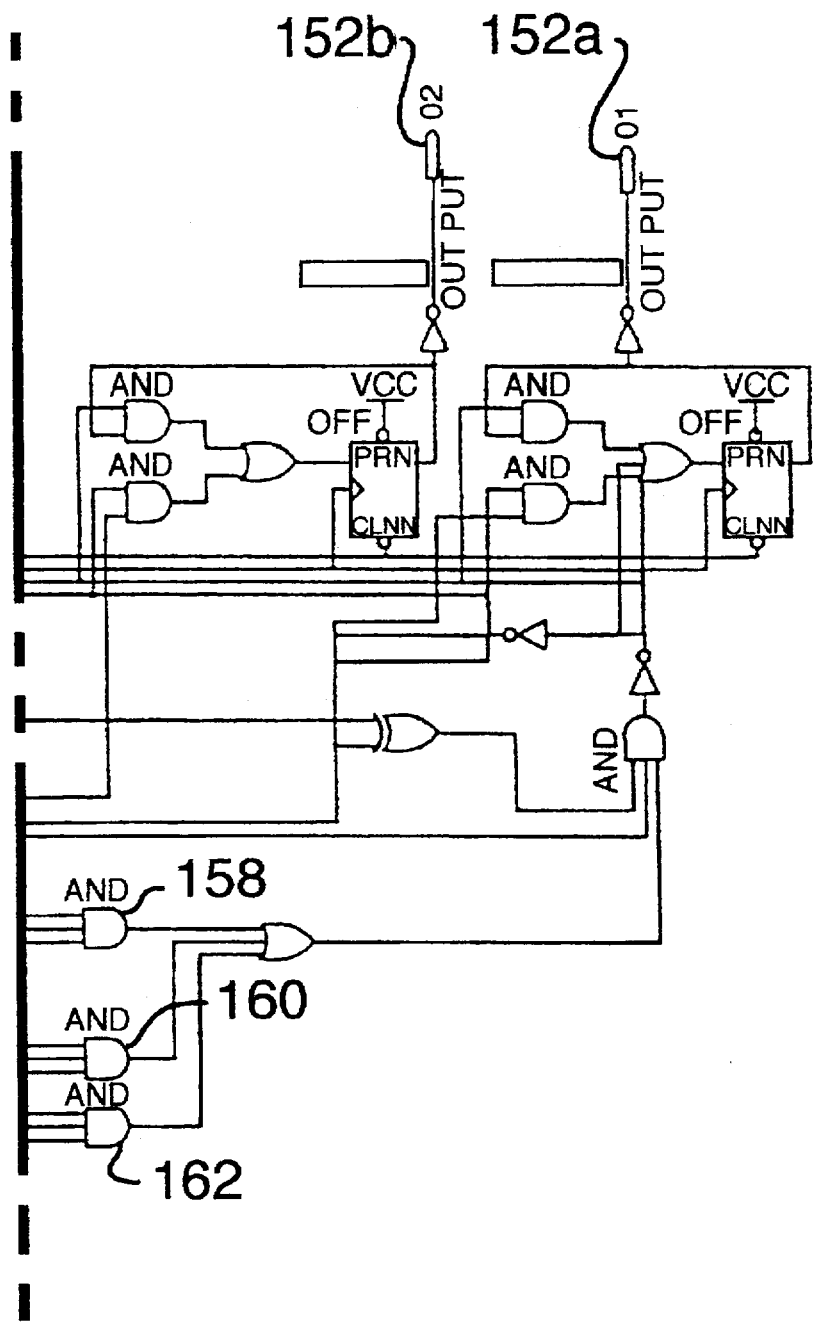
FIG. 8c3

The Clock Generator

APPARATUS AND METHOD FOR VOICE CONTROLLED APPAREL MANUFACTURE

This application is a continuation-in-part of U.S. application Ser. No. 08/155,100 filed Nov. 19, 1993, and which issued as U.S. Pat. No. 5,375,063 on Dec. 20, 1994, which is a continuation of Ser. No. 08/763,347, filed Sep. 20, 1991, abandoned and, which is fully incorporated by reference.

The invention described herein was developed pursuant to a contract with the Defense Logistics Agency, Contract Purchase Order No. DLA900-87-D-0017, and may be subject to rights and restrictions therein.

BACKGROUND OF THE INVENTION

The present invention relates to apparel manufacture equipment and more particularly to that which is controlled by an operator's voice command.

Apparel manufacture equipment includes, but is not limited to, devices such as sewing machines, embroidering machines, cutting machines, and the like. In the present state of the art, these machines are generally controlled by operators physically commanding the machine to perform some desired task or function. For instance, with regard to industrial or assembly-line type sewing machines, an operator controls the operations of the sewing machine through a foot pedal. The operator physically commands the sewing machine to perform a function by pressing his foot upon the pedal in a certain manner causing contacts within the pedal to make and/or break. These contacts in turn cause the sewing machine to respond in some desired manner.

The operator may also physically control the machine by manually operating relays, trips, and like control devices. This type of manual or physical control, especially in the case of the sewing machine with associated foot control pedal, contributes to operator fatigue and other physical ailments. For instance, a common complaint among operators using a foot control sewing machine while standing is recurring lower back pain and leg problems. These ailments can be attributed to the fact that the operator must essentially balance himself upon one foot while maintaining control of the machine with the other foot over extended periods of time. Additionally, the operator in many instances must maintain his foot on the control pedal at a certain angle or tilt and with a certain amount of pressure to maintain the machine operating in a certain mode. This is an ergonomically unsound working condition and, in time could lead to serious health problems for the operators and financial hardships for the employer in the way of sick leave, insurance and disability payments, and the like. The present invention addresses these problems and provides an apparatus and method to overcome them.

OBJECTS AND SUMMARY OF THE INVENTION

It is a principal object of the present invention to provide an apparatus wherein an operator controls specific operations of apparel manufacture equipment through verbal commands recognized by the equipment as distinct from other sounds in the environment and of the equipment.

A further object of the present invention is to provide an apparel manufacture system that recognizes and translates an operator's verbal command into a digital control signal that is recognized by and actable upon by apparel manufacture equipment, such as a sewing machine.

It is also an object of the present invention to provide improved apparatus and method for speech recognition control of sewing machines.

Another object of the present invention is to provide an apparatus and method for voice control of any variety of apparel manufacture equipment machines such as an embroidering machine.

Yet a further object of the present invention is to provide apparatus and method whereby an operator can control the operation of apparel manufacture equipment without the use of hand or foot control devices.

A still further object of the present invention is to provide an ergonomically effective method and apparatus for controlling apparel manufacture equipment.

Still another object of the present invention is to provide a method and apparatus which allows a physically handicapped person to operate apparel manufacture equipment.

Still another object of this present invention is to provide an apparel manufacture system capable of discriminating speech patterns for a plurality of different operators and responding to one or more of the individual operators' specific speech patterns.

Yet another object of the present invention is to provide an apparel manufacture system capable of receiving a library of operator-specific voice reference patterns stored in an apparatus which can be downloaded into the apparel manufacture system prior to operating same.

It is also an object of the present invention to provide apparatus which can be retrofitted to existing apparel manufacture equipment to enable an operator to control specific operations of the apparel manufacture equipment through verbal commands recognized by the equipment as distinct from other sounds in the environment and of the equipment.

Still another object of the present invention is to provide apparatus for speech recognition control of apparel manufacture equipment capable of multi language/accent support.

And still another object of this invention is to provide an apparel manufacturing system capable of speech control from a portable personal sized battery powered speech recognition device.

It is an additional object of the present invention to provide an apparel manufacturing system capable of control from a portable personal sized speech recognition device that requires no physical electrical connection with the manufacture equipment, thereby permitting an operator greater mobility and reducing the possibility of injury or property damage through entanglement with an electrical cord.

It is a still further object of the present invention to provide an apparel manufacture system capable of recording and storing the order and timing of a sequence of digital control signals and executing the control signal sequence, in the proper order and at the proper timing, in response to a single operator command.

It is another object of this invention to provide a self-tuning apparatus for speech recognition control of apparel manufacture equipment capable of recalibration in response to a changed ambient environment.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, apparatus for manufacturing apparel is provided wherein an operator controls specific operations of the apparatus through verbal commands recognized by the apparatus as distinct from other sounds in the environment of the apparatus. The apparatus of the present invention comprises means for performing an apparel manufacturing task; means for recognizing and translating a verbal command into a digital control signal; means for inputting an operator's verbal command into the recognizing and translating means; and interfacing means for presenting a digital control signal from the recognizing and translating means to the apparel manufacturing task means in a form recognized and accepted by the apparel manufacturing task means, the interfacing means being in communication with the recognizing and translating means.

In one preferred embodiment of this invention, the interfacing means modifies the digital control signal into a form recognized and actable upon by the apparel manufacturing task means. In this embodiment, the interfacing means may comprise a conventional relay box or station. In another preferred embodiment, the digital control signal from the recognizing and translating means is already in a form recognized and accepted by the manufacturing task means. In this instance, the interfacing means routes the digital control signal to the apparel manufacturing task means without modifying the signal.

The recognizing and translating means according to the present invention preferably comprises a speech recognition computer. This speech recognition computer in turn preferably comprises means for creating a library of operator specific digitized voice reference patterns correlating to a set of specific control signals; means for storing the library of operator specific voice reference patterns; and means for accessing the control signal corresponding to the operator specific voice reference pattern that matches the operator's verbal command. In a most preferred embodiment of this invention, the speech recognition computer is relatively small and portable and can be worn by an operator, for instance, on his belt.

In yet another preferred embodiment of the present invention, the speech recognition computer communicates with the interfacing means through an infrared light linkage and identifies a specific manufacturing task means by including an identification code within the transmission therefrom.

In another preferred embodiment of the present invention, the apparatus further comprises means for training the speech recognition computer to operate with a specific individual operator. This training means may comprise an external computer, such as a personal computer or hand-held computer, that is interfaceable, i.e., connected to communicate electrically, with the speech recognition computer. Alternatively, for example, the training means may be configured within the speech recognition computer. The training means is configured to allow an operator to communicate with and cause the speech recognition computer to create a library of operator-specific digitized voice reference patterns.

In still another preferred embodiment of the present invention, the speech recognition computer is configured such that, upon receiving a certain verbal command from the operator, the computer records the order and timing of the digital control signals corresponding to digitized voice reference patterns matching the operator's subsequent verbal commands and stores this sequential information in association with a preset voice reference pattern that has been recorded by the operator and stored by the computer.

Subsequently, the computer will, upon matching the stored preset voice reference pattern to a verbal command from the operator, communicate the corresponding stored control signals to the manufacturing equipment in the order and timing of the recorded sequence.

Furthermore, in another preferred embodiment of this invention, the speech recognition computer is capable of self calibration. In this embodiment, the computer, upon receiving an instruction to recalibrate, prompts the operator to repeatedly issue verbal commands corresponding to certain stored voice reference patterns. By determining the variance between the prompted commands and the stored voice reference patterns, the computer adjusts certain parameters to permit more optimal operation in a changed sound environment.

Examples of such parameters include recognition threshold, delta score, and gain. In particular, the recognition threshold defines the degree of similarity between an operator's verbal command and a stored voice reference pattern required before the computer recognizes a match. The delta score defines the minimum difference between the similarity of an operator's verbal command to a first stored voice reference pattern and the similarity of the verbal command to any second stored voice reference pattern permitted before the computer recognizes a match between the verbal command and the first stored voice reference pattern. Adjustment of these parameters, and possibly the gain of incoming verbal commands, may permit a more optimal operation in an environment more noisy than that in which the computer was trained.

The apparel manufacturing task means of the present invention can be of any type of apparel manufacturing or sewing equipment. For example, in a preferred embodiment of the invention, the apparel manufacturing task means comprises a sewing machine. In another preferred embodiment, the manufacturing task means comprises an embroidering machine. Likewise, the manufacturing task means may comprise a clutch-type or cycle-type motor sewing machine.

In yet another preferred embodiment of the present invention, the apparel manufacturing task means further comprises an electric motor configured to control specific operational modes of the manufacturing task means. The electric motor has control circuitry that is compatible with the interfacing means and configured to receive and act upon digital control signals thereby directing the electric motor to perform a task according to an operator's verbal command. An example of this preferred embodiment would be a sewing machine with associated electric motor.

To further achieve the objects and in accordance with the purpose of the invention, as embodied and broadly described herein, the method for voice control of apparel manufacture equipment according to the present invention comprises the steps of receiving an operator's verbal command; recognizing and translating the verbal command into a digital control signal; and routing the digital control signal to the apparel manufacture equipment.

In one preferred embodiment of the method of this invention, the routing step further includes modifying the digital control signal into a form recognized and actable upon by the apparel manufacture equipment.

Preferably, the recognizing and translating step further comprises the steps of inputting a verbal command to a speech recognition computer containing a library of operator specific digitized voice reference patterns correlating to an operator's verbal commands; searching the library of digitized voice reference patterns for a specific digitized voice reference pattern corresponding to the verbal command; and accessing and sending to the apparel manufacturing task means the specific digital control signal corresponding to said digitized voice reference pattern.

In still another preferred embodiment of this invention, the method further comprises the step of training the speech recognition computer to operate with a particular operator. This training may comprise interfacing a personal computer with the speech recognition computer to initiate and conduct the training.

In yet another preferred embodiment of this invention, the method further comprises the steps of recording the sequence, comprising order and timing, of a series of digital control signals retrieved by the computer and storing instructions, capable of executing said sequence, in association with a macro definition voice reference pattern and of selecting said digital control signal sequence upon matching the macro definition voice reference pattern with an operator's verbal command.

In still another preferred embodiment of the present invention, the method further comprises the step of calibrating environment-dependent operating parameters, used in determining whether a stored voice reference pattern matches an operator's verbal command, in response to the operator's prompted verbal commands whereby said operating parameters are adjusted relative to a changed sound environment.

The accompanying drawings, which are incorporated in and constitute a part of this specification, illustrate various preferred embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended FIGS., in which:

FIG. 7b is a schematic representation of the infrared transmitter as in FIG. 7a.

FIG. 8b is a state diagram depicting the decoding operation of the receiver as in FIG. 8a.

FIG. 8c is a schematic representation of the decoding circuit of the infrared receiver as in FIG. 8a.

FIG. 8d is a schematic representation of the clock generator as in the infrared receiver as in FIG. 8a.

FIG. 9 is a schematic representation of the infrared receiver and machine interface encompassed by the embodiment of the present invention as in FIG. 8a.

Figure 1:
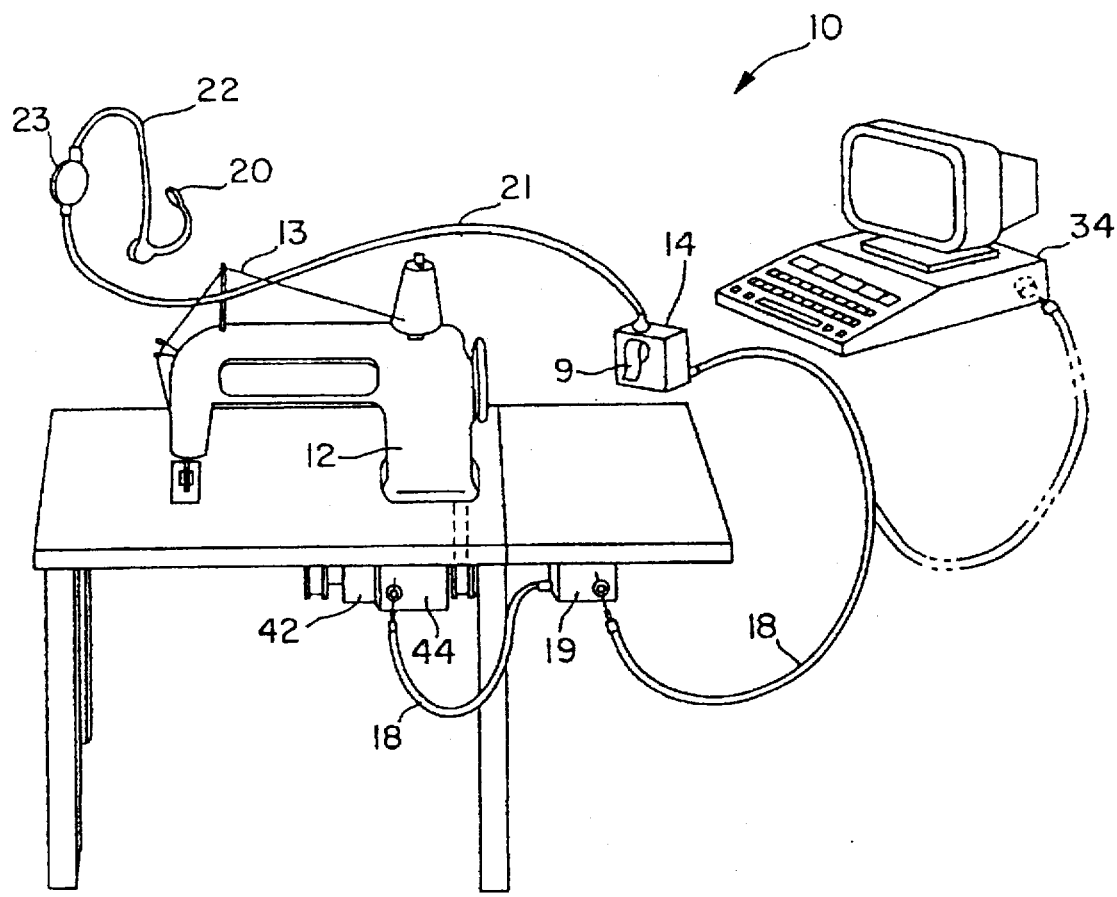
FIG. 1 is a perspective view of a schematic illustration of an embodiment of the apparatus of the present invention.

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

Figure 2:
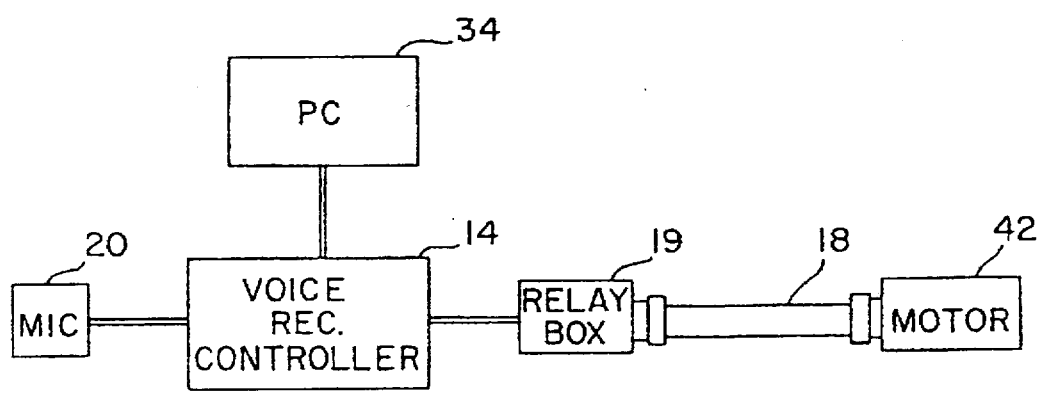
FIG. 2 is a schematic representation of the embodiment of the invention shown in FIG. 1.

A preferred embodiment of the present invention is shown in FIGS. 1 and 2 (schematically) and generally designated by the numeral 10.

In accordance with the present invention, means are provided for performing a machine task such as an apparel manufacturing task. As embodied herein, an apparel manufacturing task means can include an apparel manufacture device or equipment capable of carrying out a desired task in the manufacture of apparel. Such tasks can include sewing, cutting, stitching, folding, pressing, stretching, or the like. Moreover, the use of the term "apparel" is not meant as a limitation of any sort upon the invention. The apparatus and method of this invention are not limited to clothing articles but include all products of the sewn products industry, for example curtains, seat covers, tents, sails, furniture upholstery and the like. Moreover, machine tasks other than apparel manufacturing could be adapted in accordance with the present invention.

As embodied herein and shown in FIG. 1 for example, one embodiment of a means for performing an apparel manufacturing task can include a sewing machine 12 which can sew two pieces of fabric together or attach thread 13 to a sheet of material. Sewing machine 12 may be of the clutch-type motor sewing machine, the cycle-type motor sewing machine, or an embroidering machine, but is not limited to these machines. The apparatuses and methods of the present invention are particularly suited for the field of apparel manufacture equipment that requires the skill and physical/manual control of an operator. Examples of such equipment include sewing machines, embroidering machines, cutting machines, folding machines, pressing machines, stretching machines, and the like. The following description and appended drawings generally refer to the apparel manufacture equipment as a sewing machine 12, but this is for ease of illustration only and is not meant as a limitation. For example, the present invention could just as well be used for speech control of an embroidering machine or a cutting machine or a folding machine. Moreover, it is within the scope and spirit of the present invention to consider this apparatus and method in all applications of use where voice control of apparel manufacture equipment is desired.

In accordance with the present invention, means are provided for recognizing and translating an operator's verbal command into a digital control signal. As embodied herein and shown for example in FIGS. 1–3, the recognizing and translating means preferably comprises a speech recognition computer 14. The speech recognition computer must be provided with means that converts sounds into electrical signals, which then can be received by computer 14 and converted into digital control signals that computer 14 sends via one of its output ports. In a most preferred embodiment of the present invention as depicted in FIG. 1, speech recognition computer 14 is relatively small and portable, capable of being carried by an operator, for example on his belt with belt loop 9, to a work station employing apparatus 10.

An example of a commercially available system which may be employed as speech recognition computer 14 is the MICRO INTROVOICE® by Voice Connexion. This system utilizes a NEC V-25 microcomputer operating at 8 megahertz. The system is a voice input/output system which provides speech recognition of 1,000 words with a published accuracy of better than 98%. The system includes system software for the control of recognition modes, training and updating, vocabulary and voice pattern transfers, speech recognition, and word separability testing. The MICRO INTROVOICE® system is preferred for use in a factory environment because it can operate in noisy environments in excess of 85 db. In addition, there are a number of commercially available modular speech processing systems which may be used as speech recognition computer 14 in the present invention.

Implementation of some of the presently preferred embodiments of the present invention require, however, physical, software, and/or firmware enhancements or replacements of the commercially available systems such as the MICRO INTROVOICE® system. For example, an infrared light transmitter 100 may be constructed as an output port of speech recognition computer 14 as shown generally in FIG. 4. Additionally, software enhancements to implement self-tuning and macro capabilities, shown functionally in FIGS. 5 and 6 respectively, require replacement or customization of the software and/or firmware associated with standard commercial systems such as the MICRO INTROVOICE®.

In further accordance with the present invention, inputting means are provided for inputting or receiving sounds, such as the sounds comprising an operator's verbal command, into the recognizing and translating means. As embodied herein and shown in FIGS. 2 and 3 for example, such inputting means preferably comprises a microphone 20, which is electrically connected in communication with computer 14 via a cable 21. As shown in FIG. 1 for example, microphone 20 may be of the head-set type or throat type depending upon the operating environment of apparatus 10. For instance, a throat microphone may be more desirable in a noisy operating environment. Desirably, microphone 20 is provided with an electrical transducer which converts mechanical sound energy into electrical signals which constitute an electrical representation of the sounds of the voice commands. These electrical verbal commands, so-called, are transmitted to computer 14 via cable 21. Desirably, when speech recognition computer 14 receives the electrical verbal commands from microphone 20, computer 14 converts them into digitized verbal commands. For example, computer 14 may be provided with an analog-to-digital converter for this purpose.

In an alternative preferred embodiment of this invention, the inputting means may comprise an area receiver, for example an area microphone mounted to a wall, or a desk top microphone. Desirably, the inputting means should be sensitive enough to pick up the operator's verbal commands and be in communication with speech recognition computer 14.

Desirably, as shown in FIG. 1 for example, microphone 20 forms part of a headset 22. Headset 22 allows an operator to maintain his hands free and moves with the operator's head. Headset 22 desirably includes a receiver 23 which forms part of the earpiece of headset 22. The voice synthesizer of computer 14 can be connected via cable 21 and receiver 23 to be heard by the operator wearing headset 22.

Figure 3:
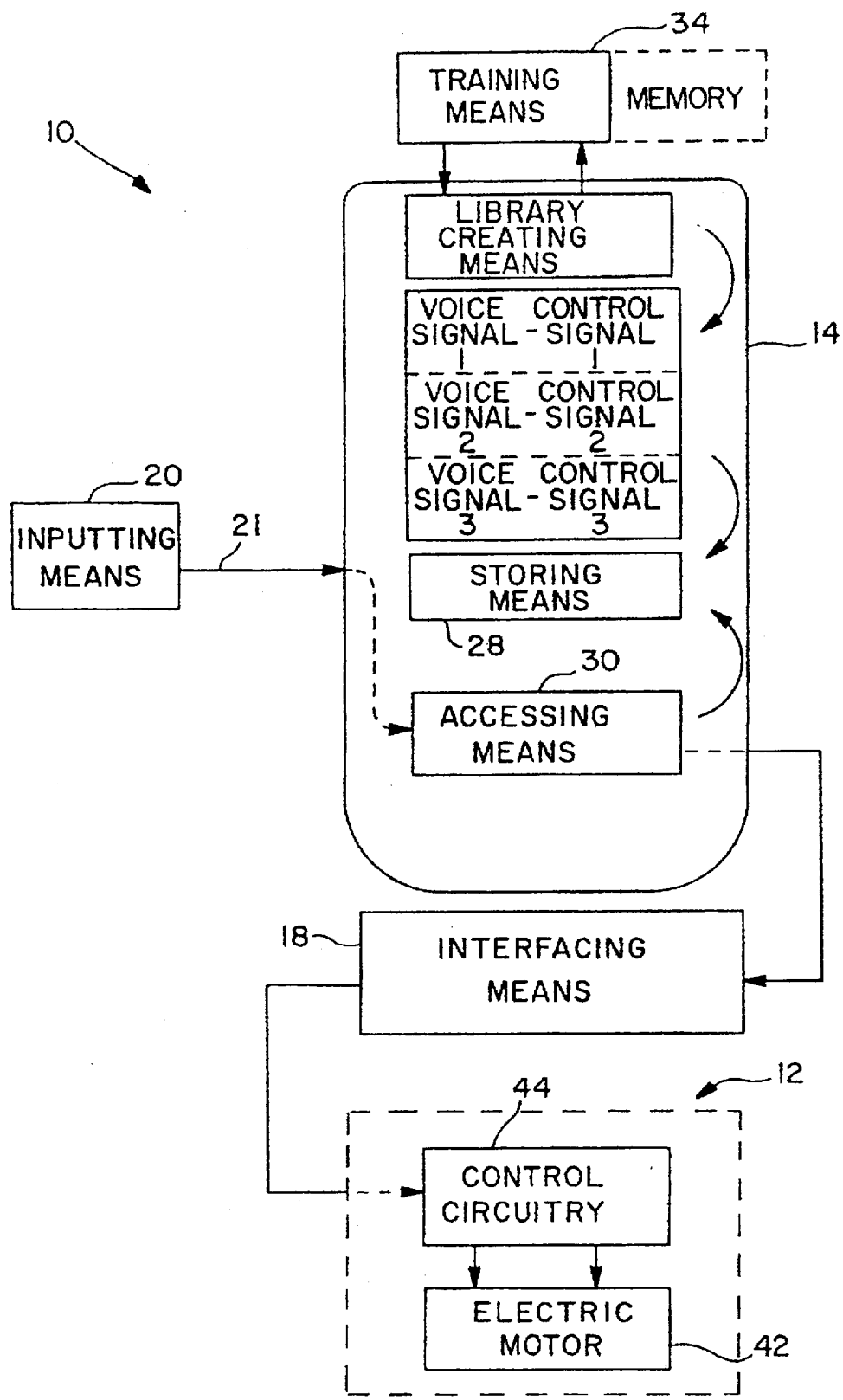
FIG. 3 is yet another schematic representation of the apparatus and method according to the present invention.

As embodied herein and schematically shown in FIG. 3 for example, speech recognition computer 14 preferably includes means for creating a library of operator-specific digitized voice reference patterns. In other words, in this library, a particular digitized voice reference pattern will be correlated to a particular digital control signal. In this way, as depicted in FIG. 3, an entire set of digital control signals will be made specific to the voice reference patterns of a particular operator or operators. Then, as explained below, upon matching a received digitized verbal command to a stored digitized voice reference pattern, computer 14 sends the corresponding digital control signal to an output port of computer 14. The library creating means allows an operator to create his own personal library of voice reference patterns which are recognized and accepted as verbal commands by speech recognition computer 14. Essentially, the library creating means allows an operator to input a verbal signal into speech recognition computer 14 which in turn matches the operator's verbal command with the digitized voice reference pattern which is in turn associated with a digital control signal.

As embodied herein and schematically illustrated in FIG. 3 for example, speech recognition computer 14 further includes means for storing the library of operator-specific digitized voice reference patterns. In a preferred embodiment, the storing means consists of a memory device, such as a nonvolatile RAM, forming part of speech recognition computer 14. As schematically shown in FIG. 2 for example, these storing means allow the operator to download his library of voice reference patterns from an external memory device such as a personal computer 34 to speech recognition computer 14.

In a most preferred embodiment, the storing means comprises a nonvolatile memory within speech recognition computer 14. This allows for speech recognition computer 14 to be relatively small and portable. This arrangement is also preferred because it eliminates the necessity of the operator having to download his voice reference patterns to speech recognition computer 14 prior to each use of apparatus 10. The library of voice reference patterns would remain in the memory until another operator subsequently downloads his personal library to speech recognition computer 14.

In an alternative embodiment of this invention, speech recognition computer 14 can include a permanent type of memory (e.g., hard drive) system. In this alternative embodiment, the library of operator-specific voice reference patterns for all operators could be stored permanently within speech recognition computer 14. The operator could then simply access his personal library from the hard drive and transfer the library to the operating storing means.

As depicted schematically in FIG. 3 for example, speech recognition computer 14 further comprises means for accessing operator-specific digitized voice reference patterns from the library. The accessing means selects from an operator's stored library of voice reference patterns, a particular voice reference pattern that corresponds to a specific verbal command inputted by the operator. The accessing means can include a preprogrammed microcomputer. This preprogrammed microcomputer gives speech recognition computer 14 the capabilities of recognition, vocabulary and voice pattern transfers, and word separability testing.

An example of the library creating means includes the Voice Utility Program (VUP) provided with the MICRO INTROVOICE® system as a basic voice system program. This program provides for vocabulary creation, editing, user training, testing, and maintenance. As has been described above and is described in more detail below, however, some presently preferred embodiments of this invention alternatively comprise customized programming in place of the VUP to enable expanded vocabulary capabilities.

An example of the storing means includes the 128Kb RAM memory in the MICRO INTROVOICE® system.

An example of the accessing means is a microprocessor preprogrammed as the system software of the MICRO INTROVOICE® system.

Referring to FIGS. 1 and 3, in operation, an operator inputs a verbal command into speech recognition computer 14 via microphone 20. Preferably, the operator is wearing speech recognition computer 14 on his person, for example hanging from his belt by belt loop 9. Computer 14 digitizes the electrical verbal command received from microphone 20. The accessing means 30 performs a comparison between the digitized signal which represents the voice or speech pattern of the verbal command, and each of the digitized voice reference patterns which form the library in the storing means 28 of computer 14. If the comparison performed by the accessing means yields one or more signals that test within one or more certain predetermined ranges of values, the accessing means deems the comparison to result in a match, which corresponds to the speech recognition computer recognizing the verbal command. For example, the signals resulting from the comparison may include a recognition threshold signal, a delta score signal, and a gain signal, each of which being more fully explained below. Upon recognizing the specific verbal command, computer 14 then selects from the library of stored voice reference patterns the digitized voice reference pattern corresponding to the verbal command and retrieves its associated control signal, sending said control signal to an output port of computer 14. This latter operation corresponds to the final step of the speech recognition computer recognizing and translating a voice command into a digital control signal.

Desirably, speech recognition computer 14 may also have the capability of voice synthesis. In that case, speech recognition computer 14 can include a voice synthesizer to communicate with the operator. This arrangement is desirable when the operator speaks a verbal command into microphone 20 but when the accessing means of speech recognition computer 14 carries out the comparison function, computer 14 is unable to find in the stored library a digitized voice reference pattern corresponding to the electronic signal of the operator's verbal command. Upon such occurrence, computer 14 is programmed to operate the voice synthesizer to communicate with the operator in a manner using the spoken word to inform the operator that the command spoken by the operator into microphone 20 was not recognized by computer 14. Then, the operator could re-input the verbal command until it is recognized by computer 14.

Figure 5:
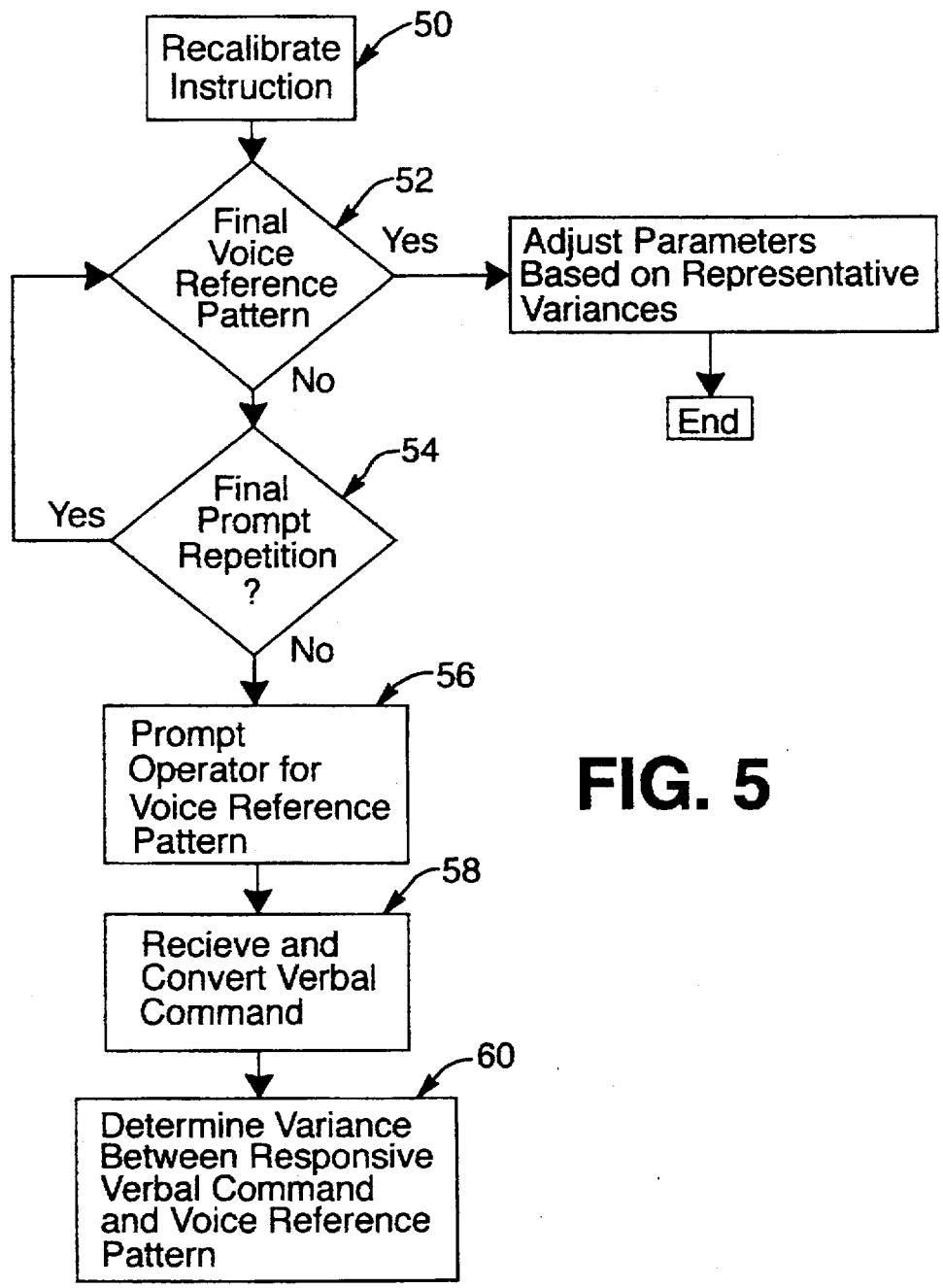
FIG. 5 is a flow diagram of the method according to yet another embodiment of the present invention detailing a system calibration capability.

The voice synthesis capability is also employed in another presently preferred embodiment of the present invention the operation of which is detailed in FIG. 5. In this embodiment, speech recognition computer 14 has the capability to recalibrate itself in response to prompted verbal commands from the operator. Such recalibration is typically desired when the operator has trained speech recognition computer 14 in one location and then attempts to operate the system in another location having a greater degree of ambient noise, for example a shop floor. In such a situation, the ambient noise may cause speech recognition computer 14 to reject verbal commands it would otherwise have matched to voice reference patterns stored in the operator's library.

To accommodate for changed environmental conditions, speech recognition computer 14 of this presently preferred embodiment is capable of recalibrating environment-dependent operating parameters, such as recognition threshold and delta score. Specifically, recognition threshold defines the degree of similarity between the digitized verbal command and the stored digitized voice reference patterns required before speech recognition computer 14 recognizes a match. Delta score defines the minimum difference between the similarity of the digitized verbal command to a first stored digitized voice reference pattern and the similarity of the digitized verbal command to any second stored digitized voice reference pattern permitted before speech recognition computer 14 recognizes a match between the digitized verbal command and the first stored digitized voice reference pattern.

That is, upon receiving a verbal command from the operator, speech recognition computer 14 compares the digitized verbal command to each digitized voice reference pattern stored in the operator-specific library and determines the variance between the verbal command and each voice reference pattern and whether the variance corresponding to any stored voice reference pattern falls within the recognition threshold. Before a voice reference pattern falling within this threshold and having the least variance can be deemed a match, however, there must be no other voice reference pattern, either within or without the recognition threshold, having a variance from the verbal command so low as to create an unacceptable likelihood of a mismatch. Thus the delta score is the minimum difference permitted between the variance associated with the candidate voice reference pattern and that associated with any other voice reference pattern permitted before speech recognition computer 14 recognizes a match between the verbal command and the candidate voice reference pattern.

Referring now to FIG. 5, a flow diagram of the recalibration routine of speech recognition computer 14 is shown. Generally, upon receiving the recalibration instruction from the operator, speech recognition computer 14 prompts the operator to repeatedly issue preselected verbal commands corresponding to certain or all of the voice reference patterns stored in the operator's library. By determining the variances at each repetition, speech computer 14 determines a representative variance for each voice reference pattern in the library. Based upon these representative variances, speech recognition computer 14 adjusts the recognition threshold and the delta score so that verbal commands having variances near the representative variances will be recognized as matches. Furthermore, the scope of the present invention incorporates the optimization of additional parameters, for example, the gain applied to received verbal commands.

More specifically, and again referring to FIG. 5, the operator issues a recalibrate instruction, in this preferred embodiment by means of a switch or button mounted on the casing of speech recognition computer 14, at 50. If the computer is not at the final voice reference pattern to be prompted or the final prompt of a specific voice reference pattern at 52 and 54 respectively, speech recognition computer 14 prompts the operator at 56 for one of the stored voice reference patterns. After receiving and digitally converting the responsive verbal command at 58, the variance between the responsive verbal command and the voice reference pattern is determined at 60. When the final prompt is detected at 54 for the final voice reference pattern at 52, speech computer 14 adjusts the recognition threshold and delta score based on the representative variances as described above.

In a preferred embodiment of this invention, speech recognition computer 14 has the capability to process, store, and recognize word groups, not just single-word verbal commands. For example, the MICRO INTROVOICE® system can isolate word groups into separate sub-libraries within a single master library and up to 15 independent sub-libraries can be accessed at any time. This arrangement is preferred because it provides far greater flexibility in composing the library of verbal commands.

The present invention is not limited to any particular language or even to any use of spoken words in general. For example, the operator need not speak English when "training" speech recognition computer 14 to associate a sound with a digital control signal. In addition, any combination of sounds uttered by an operator can correspond to a digital control signal. In other words, an operator need not speak the word "stop" to command the apparel manufacture equipment to cease operating. Speech recognition computer 14 can be trained by the operator so that any distinct voice reference pattern will correlate to a specific control signal. The operator may choose voice reference patterns such as numbers or colors to correspond to a specific control signal which causes the apparel manufacture equipment to stop, for example. The operator need not use the word "stop" as the command. For example, if the operator has trained speech recognition computer 14 to correlate spoken numbers to a particular digital control signal, then speech recognition computer 14 will only generate that control signal response to those particular spoken numbers matching the speech pattern of that particular operator.

In an alternative preferred embodiment of the present invention, speech recognition computer 14 is configured to be compatible with more than one operator while maintaining the capability of distinguishing between operators. Thus, apparatus 10 is not restricted to use with only one particular operator. Any operator can operate any apparel manufacture equipment by downloading his library of digitized voice reference patterns to the storing means of speech recognition computer 14. However, once a particular operator's library is downloaded to computer 14, then only that operator can operate the apparel manufacture equipment forming part of apparatus 10. Thus, apparatus 10 discriminates between operators while being compatible with any number of operators.

Speech recognition computer 14 also preferably maintains the capability to recognize words or commands in context. For instance, if an operator were using apparatus 10 in a factory environment and were to engage in a conversation, it would be undesirable to have computer 14 process every verbal word or sound that it picked up. The operator could place apparatus 10 in a standby or passive mode by inputting a verbal command, for example, the word "relax." Speech recognition computer 14 can be "trained" to put itself into a passive mode upon receiving a certain verbal command. This assumes that computer 14 had been programmed to translate the word "relax" to a control signal that puts apparatus 10 in a passive mode of operation. Apparatus 10 would remain in that passive mode until receipt of another command, for example the spoken word "attention," which would have been preprogrammed to cause computer 14 to assume the active mode of operation. Thus, instead of sending a digital control signal to an output port upon receiving a particular voice command corresponding to the command to assume the passive mode, computer 14 would send itself a signal to suspend the accessing means from sending further control signals to the output port. It would then listen for another particular verbal command that would place it back into its active mode of sending its control signals to its output port. For example, the control program in the microprocessor NEC V-25 microcomputer in the MICRO INTROVOICE® system has such a capability.

In another presently preferred embodiment of the present invention, speech recognition computer 14 also preferably maintains a macro capability. That is, the computer, in response to the operator's command, records the order and timing of a series of verbal commands and executes the command sequence, in the proper order and at the proper timing, in response to a single operator command.

Figure 6:
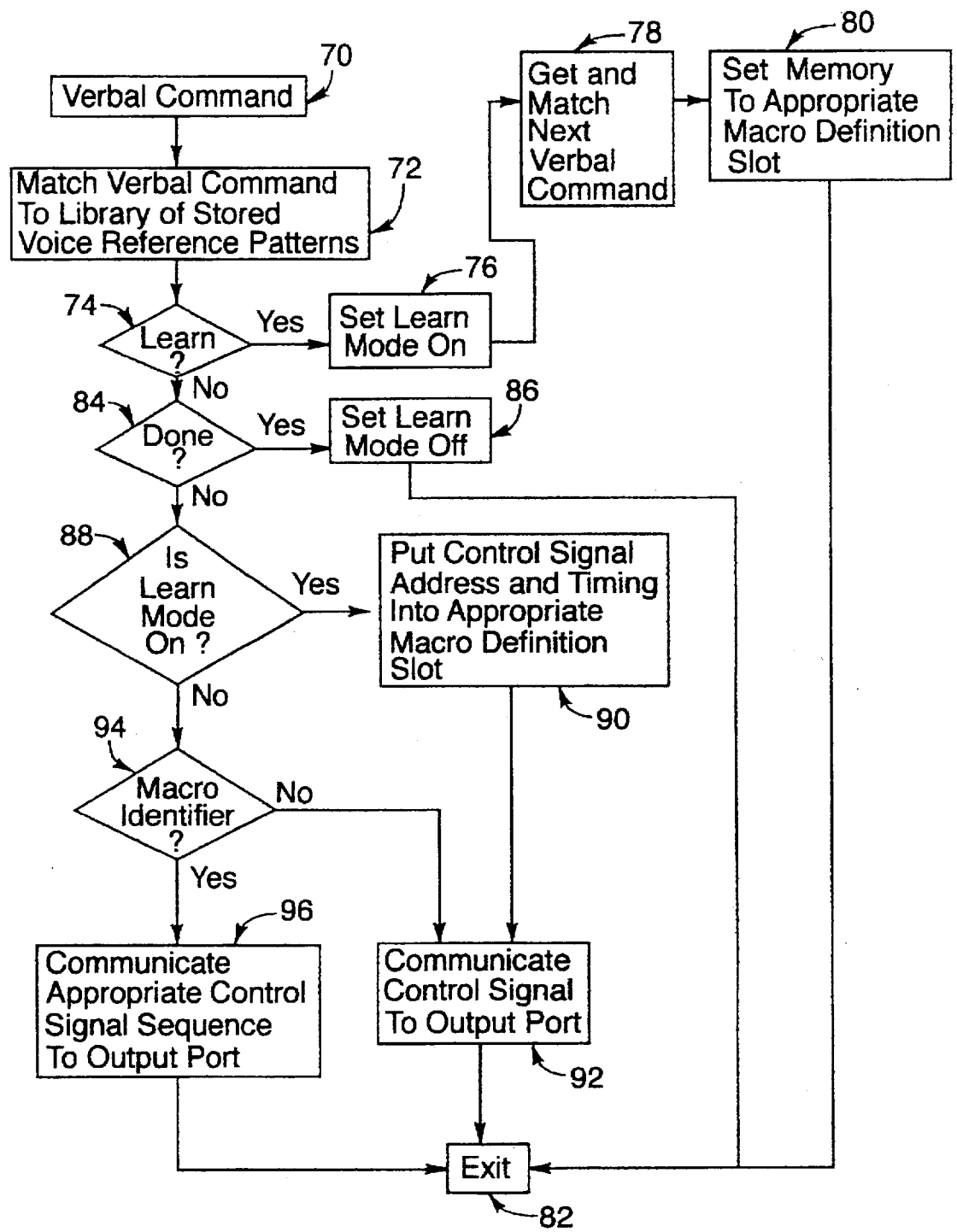
FIG. 6 is a flow diagram of the method according to still another embodiment of the present invention depicting a system macro capability.

Regarding the macro capability, a procedure executed by the accessing means of speech recognition computer 14 is detailed in the flow chart depicted in FIG. 6. Upon receiving a verbal command at 70, speech recognition computer 14 matches the command to the library of stored voice reference patterns at 72. If at 74 the computer has matched the verbal command with the stored voice reference pattern that is the learn mode reference pattern, in this embodiment "learn," indicating that the macro capability should be activated, learn mode is activated at 76. The computer will then look at 78 for a verbal command matching one of the preset stored macro definition voice reference patterns. These specific voice reference patterns are stored in the operator specific library but are associated with a macro memory position instead of a digital control signal. Thus, when the computer matches the verbal command at 78 to a macro definition voice reference pattern, memory is set to the appropriate macro memory position at 80 and the loop is exited at 82. Thereafter, computer 14 will record the order and timing of subsequent control signals corresponding to matched digitized voice reference patterns until receiving a command, in this embodiment "done," at 84 to deactivate the macro capability at 86.

If the learn mode is activated at 88, however, speech recognition computer 14 is already in learn mode and records the address, or position, of the digital control signal corresponding to the matched digitized voice reference pattern and the time between its selection and that of the prior digital control signal at 90 and communicates the control signal to the output port of computer 14 at 92. In this embodiment, the selected digital control signals are recorded. It is to be understood, however, that the digital voice reference patterns could also, or alternatively, be recorded without departing from the scope of the invention. Thus, by activating the macro capability, the operator creates a macro while executing a sequence of operations.

Once created, the operator may execute the macro by issuing a verbal command corresponding to one of the macro definition voice reference patterns. If the computer detects one of these macro definition voice reference patterns at 94, the appropriate control signal sequence is communicated, in the proper order and timing, to the computer's output port at 96.

In accordance with the present invention, interfacing means are provided for presenting, or routing, the digital control signal to the means for performing an apparel manufacturing task in a form recognized and accepted by the apparel manufacturing task means. Desirably, the interfacing means is connected in communication with the recognizing and translating means. In one preferred embodiment of this invention shown in FIGS. 1 and 2 for example, the interfacing means can include an electrical cable 18, which routes the digital control signal from an output port of speech recognition computer 14 to sewing machine 12 or another apparel manufacture equipment. In this embodiment, the control signal generated by speech recognition computer 14 already exists in a form recognized by and actable upon by sewing machine 12, the apparel manufacture equipment.

In another preferred embodiment of the invention shown schematically in FIGS. 1 and 2 for example, the interfacing means may comprise a relay box or station 19 in addition to cable 18. Relay box 19 is configured to modify the digital control signal into a form recognized by and actable upon by the particular apparel manufacture equipment forming part of apparatus 10 of the present invention. For example, in the embodiment of the invention depicted in FIGS. 1 and 2, speech recognition computer 14 may, for example, employ a RS-232 serial interface, as is used in the MICRO INTRO-VOICE system. Sewing machine 12 may not be capable of being actuated or controlled by RS-232 signals in serial form, hence relay station 19 is provided to modify the control signal into an appropriate collection of relay closures.

A conventional relay station can be used as relay box 19. Relay box 19 may, for example, include a relay station comprising a solid state logic circuit for converting a parallel TTL signal into appropriate relay signals.

In still another preferred embodiment of the present invention, the interfacing means is connected in communication with the recognizing and translating means by an infrared light linkage. This linkage obviates the need for cable 18, as depicted in FIG. 1, between speech recognition computer 14 and relay box 19, thereby allowing an operator greater freedom of movement and preventing possible cable entanglements.

Figure 4:
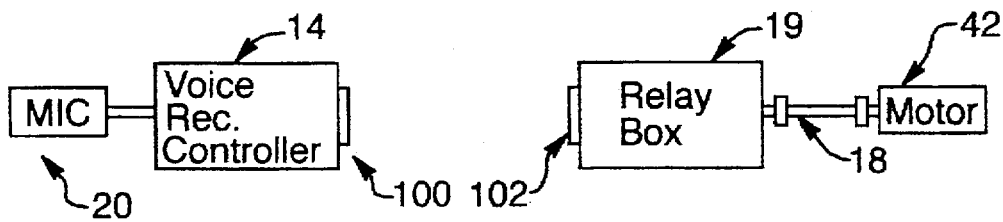
FIG. 4 is a schematic representation of another embodiment of the present invention.

The infrared linkage is shown generally at FIG. 4, wherein a transmitter 100, mounted on speech recognition computer 14, communicates with a receiver 102, mounted on relay box 19. It should be understood, however, that such a configuration is by way of example only. For example, receiver 102 may be mounted on the underside of the table similarly to box 19 as shown in FIG. 1, and connected by a cable 18 to relay box 19. Furthermore, and in a presently preferred embodiment, transmitter 100 is constructed within the housing of speech recognition computer 14. It will be understood by those of ordinary skill in the art that all such equivalent physical configurations are within the scope of the present invention.

Figure 7A:
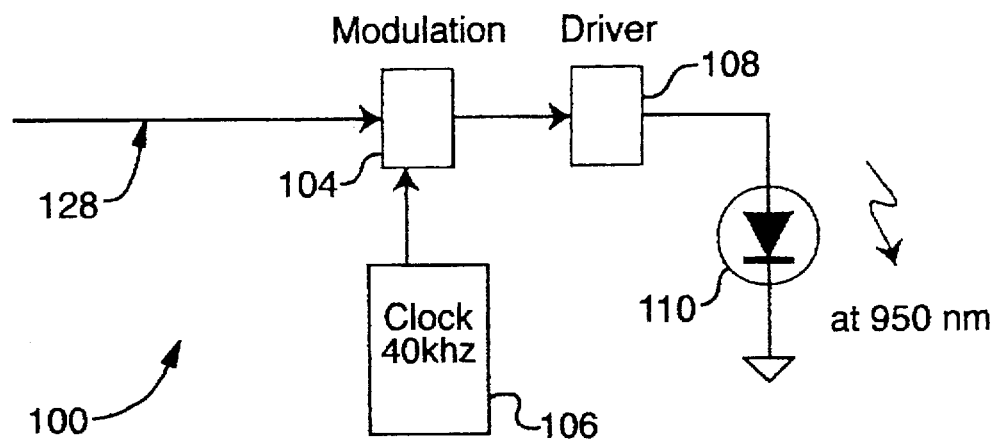
FIG. 7a is a functional diagram of an infrared transmitter encompassed by yet another embodiment of the present invention wherein an infrared light linkage is employed.
Figure 8A:
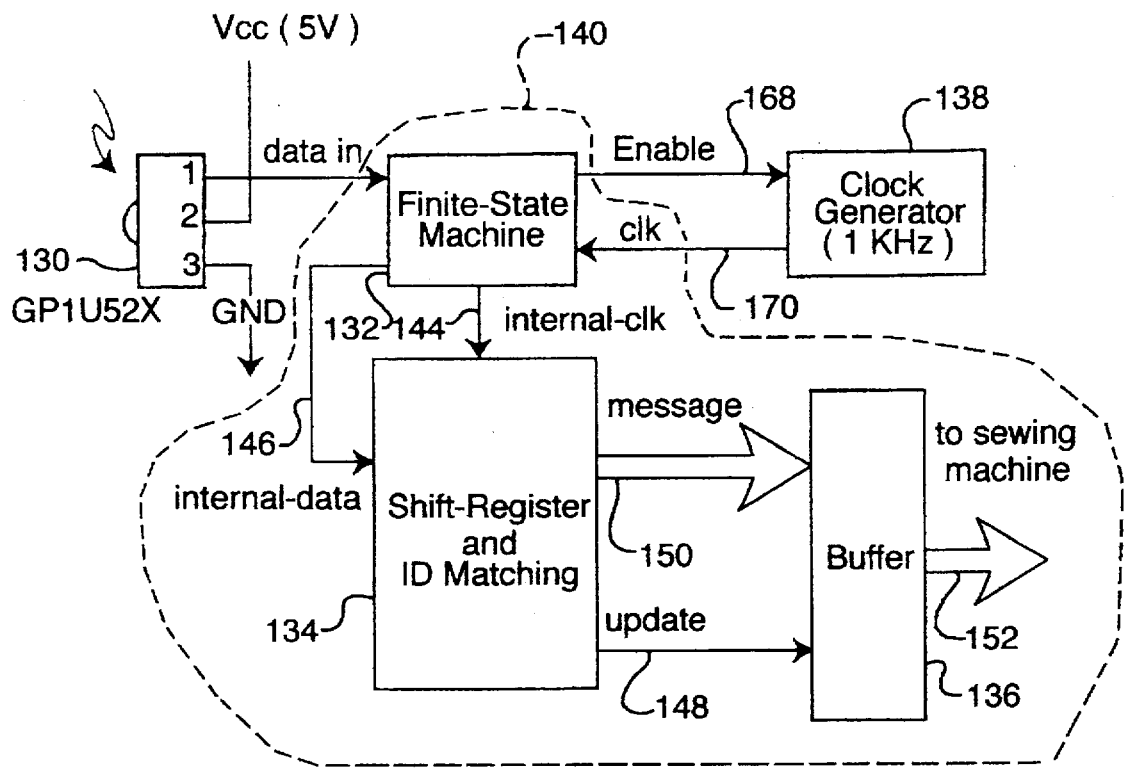
FIG. 8a is a functional diagram of an infrared receiver encompassed by the embodiment of the present invention as in FIGS. 7a, 7b, and 7c.

Transmitter 100 and receiver 102 are functionally depicted in FIGS. 7a and 8a respectively. Referring to FIG. 7a, a digital output signal at data line 128 from speech recognition computer 14 is used to modulate a carrier by a modulator 104, which is regulated by a clock 106. The transmission rate is determined by speech recognition computer 14. The presently preferred embodiment as in FIG. 7a transmits at 1Kbits per second. A driver 108 amplifies the resulting modulated signal to drive an infrared light emitting diode 110.

Figure 7B:
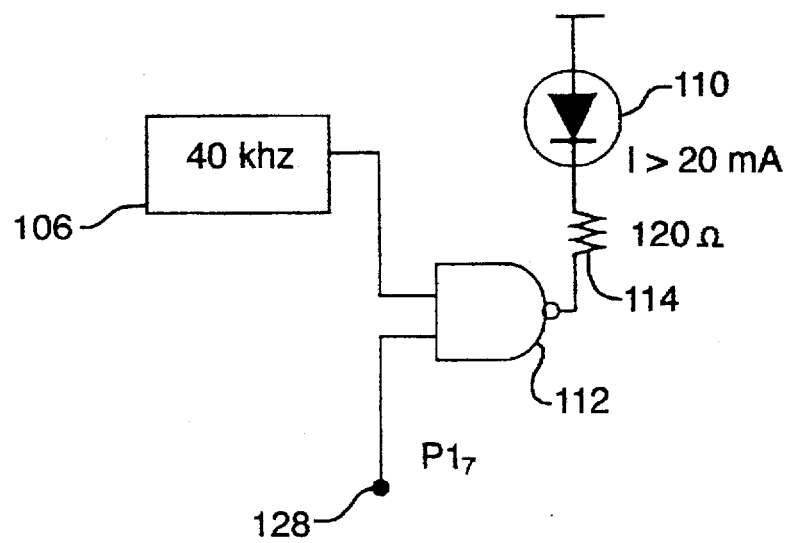

A physical embodiment of the transmitter as in FIG. 7a is depicted in FIG. 7b. Modulator 104 and driver 108 are embodied in a powered NAND gate 112. The inputs to NAND gate 112 are the data signal from speech recognition computer 14 and the 40kHz oscillating signal from clock 106. In this embodiment, clock 106 is an Epson America SE3316 quartz crystal having a load capacitance of 11 pf and series resistance of 35 Kohms to 15 Kohms. The output from NAND gate 112 drives infrared light emitting diode 110 through a resistor 114, which in this embodiment is rated at 120 Ohms. In this embodiment, diode 110 is a Panasonic LN64PA-ND having a peak emission wavelength of 950 nm and a 45 degree beam angle.

Figure 7C:
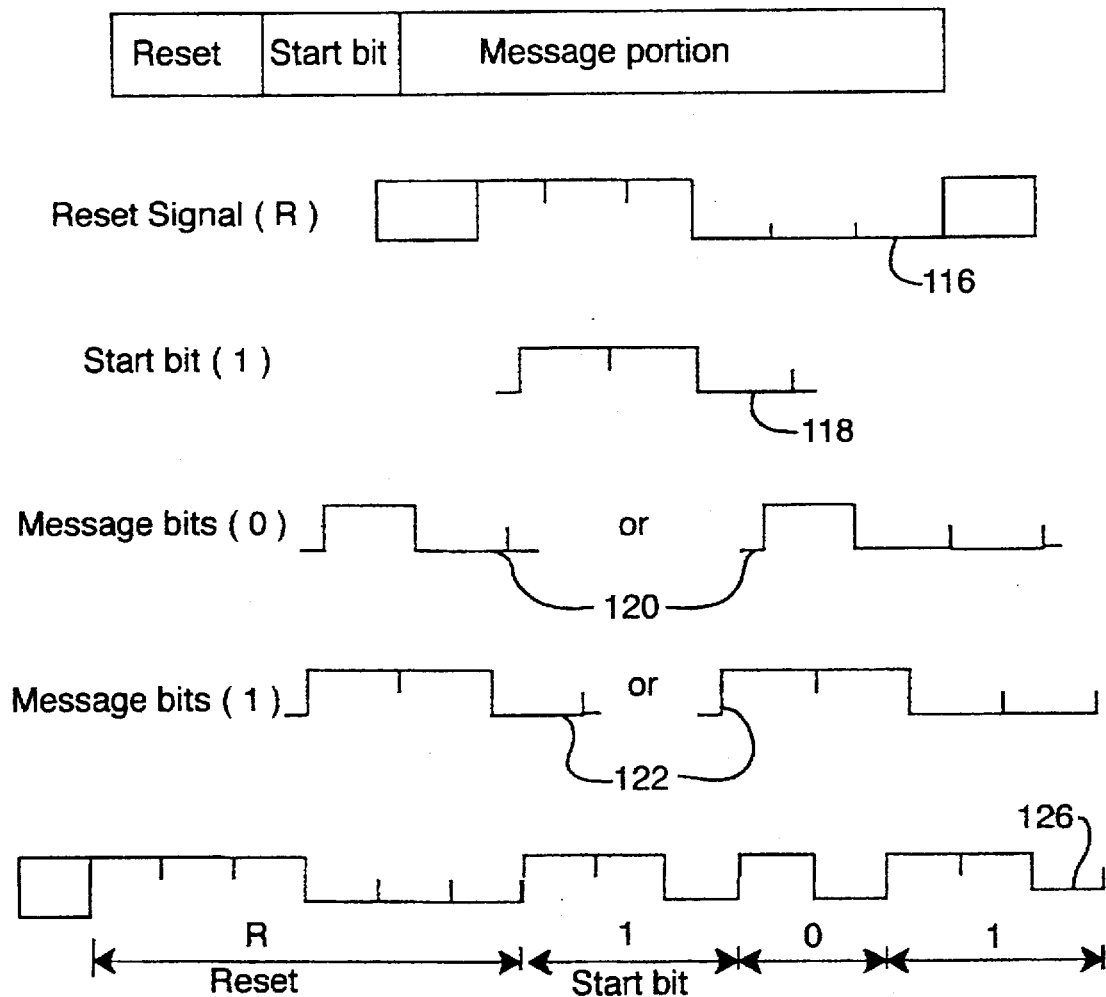
FIG. 7c is a graphical representation of the modified Morse code signals transmitted by the infrared transmitter as in FIGS. 7a and 7b.

In operation, speech recognition computer 14 provides infrared transmitter 100 with a data signal. To prevent interference by environmental light noise, a modified Morse Code is employed as depicted in FIG. 7c. More particularly, data streams are generally configured as at 116. A reset signal is followed by a start bit followed by a message stream. Examples of reset and start signals employed in this presently preferred embodiment are depicted at 118 and 120, respectively, showing high and low signals generated by speech recognition computer 14.

In this present embodiment, the message stream is comprised of bits as represented at 122 and 124. As will be explained below, "zero" bits and "one" bits may have various representations as in 122 and 124 respectively. Finally, an example of a bit stream that could be employed by this presently preferred embodiment is shown at 126, comprising reset, start, one, zero, and one bits. It will be understood by those of ordinary skill in the art, however, that various coding schemes other than Morse code, for example a scheme employing cyclic codes, could be employed without departing from the scope and spirit of the present invention, and that the use of such schemes is encompassed by such scope and spirit.

Referring again to FIG. 7b, message streams as in FIG. 7c are input to NAND gate 112 at data line 128. Clock 106 comprises the second input. When the input at data line 128 provides a high signal, the output of NAND gate 112 oscillates at the clock frequency, causing no emission from infrared light emitting diode 110. When the input at data line 128 provides a low signal, the output of NAND gate 112 remains high, causing a pulse of equal duration to be emitted from diode 112.

FIG. 8a functionally depicts receiver 102. A demodulator 130 is an infrared receiver/demodulator and in this embodiment is implemented by the integrated circuit GP1U52X, a commercially available and highly reliable hybrid infrared detector used with televisions, VCRs, audio components, and like equipment. The GP1U52X uses a pin photo diode that has its peak sensitivity at 980 nm. The internal filter blocks visible light to reduce or eliminate false operation caused by other light sources. The bandpass filter operates at 40kHz with a bandwidth of +/−4kHz.

A decoding circuit 140 is schematically indicated in FIG. 8a by the encircling dashed line. As shown in FIG. 8a, for example, a suitable decoding circuit 140 can be comprised of a finite state machine 132, a shift register and ID matching circuit 134, and a buffer 136. Finite state machine 132 is regulated by a clock 138. Generally, finite state machine 132 decodes the modified Morse Code signals from receiver/demodulator 130, outputting an internal clock signal 144 and an internal data signal 146 to shift register/ID matching circuit 134. At the end of each message stream, shift register/ID matching circuit 134 provides an "update" signal 148 to output buffer 136 if no error has occurred, and the control signal is then communicated to the interface device as described in more detail below.

Figure 8B:
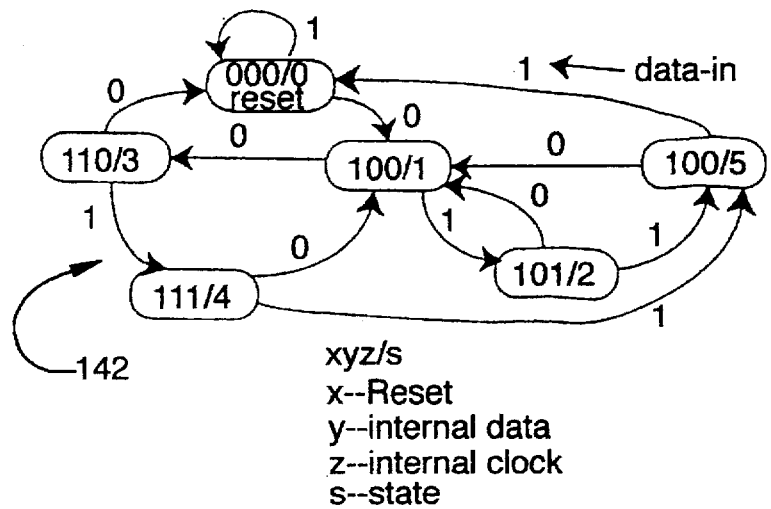

In particular, a state diagram 142 for the finite state machine is shown in FIG. 8b. Those of ordinary skill in the art will recognize, however, that this state diagram and the corresponding circuit implementation depicted in FIG. 8d comprise one presently preferred embodiment. It is to be understood that various circuitry and decoding means may be employed and are within the scope of the present invention. Referring to FIG. 8b, six states with transition paths are indicated. The 1 or 0 above each transition path arrow indicates the high or low signal, respectively, of the modified Morse codes as in FIG. 7c that prompt the state transition. In this embodiment, the state diagram is so constructed that a "one" bit or a "zero" bit as shown in FIG. 7c may have one or two trailing lows without affecting the device's operation. A falling clock pulse, represented by the "z" variable in FIG. 8b, at line 144 (FIGS. 8a and 8c) causes shift register/ID matching circuit 134 (FIG. 8a and as schematically represented in FIG. 8c) to shift registers and to read the internal data, represented by the "y" variable in FIG. 8b, at line 146 (FIGS. 8a and 8c). For example, a falling clock from state 2 to state 5 and an internal data bit of one at state 5 cause a one to be input to shift register/ID matching circuit 134.

Referring now to FIG. 8a, when 7 bits have been read, and the message ID matches the preset machine identification code, shift register/ID matching circuit 134 communicates an update signal to buffer 136 at 148, causing the four-bit control signal to be communicated to buffer 136 at 150. This signal will then control sewing machine 12 until replaced by another signal.

Referring now to FIG. 8c, the logic circuit implementation of decoder 140 is shown. In this presently preferred embodiment, the circuit is "burned" into a program logic circuit, for example an EPM5016 chip. This circuit implements state diagram 142 and the shift register of circuit 134 as discussed above. Additionally, the ID matching is now described in more detail.

The message signal read into the shift register is comprised of 7 bits comprised of a 4 bit control signal and a 3 bit identification code. The 4 bit control signal is communicated to sewing machine 12 at 152a, 152b, 152c, and 152d if the three bit matching signal matches the preset machine identification code set at inputs 154a, 154b, and 154c or if either a global identification code is received or set as the preset machine identification code. Specifically, if these bits, read from shift register 156, match the preset identification number, the output of AND gate 158 goes high, updating buffer 136 as in FIG. 8a. The same result will occur, however, if receiver 102 receives the global identification code, in this embodiment a binary seven, which causes AND gate 160 to go high. Similarly, if the inputs 154a, 154b, and 154c are set to a binary seven, AND gate 162 goes high, updating the buffer.

Thus, in this presently preferred embodiment, an operator may access a machine by any of three methods. First, he may cause his transmitter to transmit the identification code of a particular desired machine with every control signal. In this embodiment, the operator sets the identification code during the training stage through the external computer 34 (FIG. 1). However, it is to be understood to be within the scope of the present invention to encompass any equivalent technique, such as setting the identification code by voice command or by switches linked to transmitter 100. Second, the operator may cause his transmitter to transmit the global identification code, causing every machine receiving the signal to respond to the command. Finally, he may preset the receiver at a particular machine to the global identification code, causing that machine to respond to every command it receives, regardless of the signal's corresponding identification signal. The method of presetting the machine according to the presently preferred embodiment is described in more detail below with regard to FIG. 9.

Figure 8D:
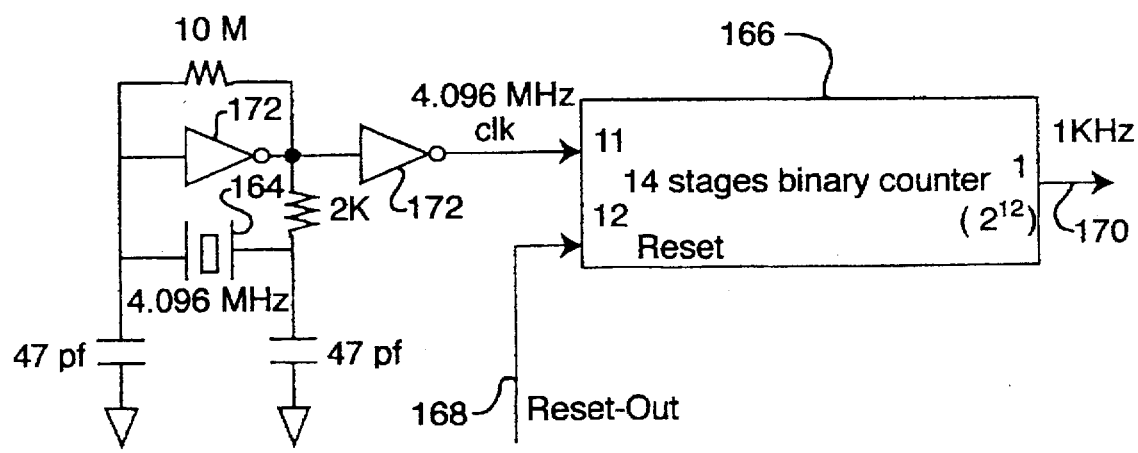

The clock generator 138 as shown in FIG. 8a is realized according to the presently preferred embodiment as shown in FIG. 8d. The clock generator 138 is comprised of a 4.096 MHz quartz crystal oscillator 164 and a 14 stage binary counter 166. The clock's operation is enabled at 168 by the "enable" output from finite state machine 132 as in FIG. 8a. When enabled, clock 138 generates a 1KHz signal at 170. In the presently preferred embodiment, inverters 172 are implemented by employing an integrated circuit device, for example an MM74HC00 or MM74HC04 chip. Similarly, binary counter 166 is implemented in this embodiment by an integrated circuit device such as a CD4060 or CD4020.

Referring now to FIG. 9, a circuit diagram of receiver 102, as represented within the dashed line so designated, and interface 19 according to this presently preferred embodiment is shown. Interface 19 is indicated by the components within the dashed line so designated. In this embodiment, a power source is schematically indicated by the components encircled by the dashed line designated 174. Power source 174 is employed to provide a 24 V source to relays 178a, 178b, 178c, and 178d. Those of ordinary skill in the art will understand, however, that power source 174 will be unnecessary for some machines having an internal power source. Such machines will provide power internally to relays 178a–d through the circuitry of interface 19.

In operation, control signal output bits are communicated to interface 19 from receiver 102 by output lines 152a, 152b, 152c, and 152d to relays 178a, 178b, 178c, and 178d, which default to an off setting. For ease of explanation, because buffer 136 is included in the circuitry of decoder 140, buffer 136 is indicated as an element of receiver 102. Because its function is to store data and because some embodiments of the present invention may include such a buffer in an interface without an infrared linkage, however, buffer 136 may also be considered an element of interface 19. As shown in FIG. 9, relays 178a–d switch on or off, depending upon the signals on lines 152a–d, and provide either 24 volts or zero volts to pins D0, D1, D2, and D3 of connector 179, thereby controlling the operation of sewing machine 12. In this embodiment, five volt power sources 180 may be supplied by power source 174 at 182. Additionally, switches 184 are used to set the machine identification number on lines 154a, 154b, and 154c as in FIG. 8c.

The above described implementation of infrared transmitter 100, receiver 102, and interface 19 depict but one presently preferred embodiment of the invention. Various equivalent electrical realizations, as will be well known in the art, could be achieved without departing from the scope of the present invention. Additionally, the electrical requirements of a particular machine to which the present invention is applied could require modifications. For example, in this embodiment, 24 volt and zero volt signals are provided to connector 179 as in FIG. 9, but it is understood that some machines may require different voltage levels.

In one preferred embodiment of this invention, a means can be provided for training the speech recognition computer to operate with a specific individual operator. The training means essentially comprises a temporary communication interface between the operator and the speech recognition computer, and allows the operator to train the computer to create the library of digitized voice reference patterns specific to that operator.

In a preferred embodiment of this invention, as shown in FIGS. 1 and 2, the training means may comprise an external computer 34, which can be in the form of a personal computer or hand-held computer (not shown). When a new operator desires to use apparatus 10 to control apparel manufacture equipment, he must train speech recognition computer 14 to recognize his speech pattern and create the library of voice reference patterns particular to that operator. External computer 34 allows the operator to communicate with speech recognition computer 14 to accomplish this task. In this embodiment, the operator creates and edits a vocabulary or library of voice reference patterns on the personal computer for later downloading to speech recognition computer 14. This library can be stored internal to external computer 34, in an installed hard drive for example as depicted in FIG. 3, or upon a memory device such as a floppy disk or computer card. In this arrangement, the training means, specifically external computer 34, further acts as a storage device for the voice reference patterns and control signals. The operator interfaces speech recognition computer 14 with external computer 34 to create the digitized voice reference patterns correlating to his verbal command signals. The signals are then stored in external computer 34 until that operator is ready to use apparatus 10. At that point, the operator again interfaces computer 34 with speech recognition computer 14 to download the library of digitized voice reference patterns to the storing means of speech recognition computer 14. Once that operation is complete, external computer 34 is no longer necessary and may be disconnected from speech recognition computer 14.

In another alternative embodiment of the invention, the training means may also be used to set certain operating parameters, such as gain control, of speech recognition computer 14.

As noted above, the operator need not create the library of digitized voice reference patterns every time he desires to use apparatus 10. The library of voice reference patterns can be stored in an outside or external memory device, for example the hard drive of external computer 34. In that case, the operator need only download the library to the memory in speech recognition computer 14, for example a nonvolatile RAM. With this embodiment, speech recognition computer 14 would not have its own "permanent" type memory (e.g., a hard drive), but weight, power, and size considerations would be reduced to allow for a smaller portable speech recognition computer 14.

In an alternative embodiment of the present invention, speech recognition computer 14 comprises its own permanent storage memory device, such as a hard drive. In this instance, the operator need only retrieve his personal library from the hard drive and place it in the operating storing means of speech recognition computer 14. In this embodiment, speech recognition computer 14 may also include the capability of interfacing with and communicating directly with the operator to create the library of digitized voice reference patterns. That is, the external training means, specifically external computer 34, would not be needed. In this application, for example, the operator may initiate the library creation by, for example, depressing a button (not shown) affixed to the housing of speech recognition computer 14, causing speech recognition computer 14 to prompt the operator for voice reference patterns.

Similarly, in yet another preferred embodiment, speech recognition computer 14 also includes the capability to edit previously stored digitized voice reference patterns. Such a configuration is particularly useful when the operator encounters difficulty in giving a voice command that will match a digitized voice reference pattern. In this application, the operator may instruct, for example by push-button instrumentation affixed to the housing of speech recognition computer 14, speech recognition computer 14 to prompt the operator to repeat the desired command, thereby recording a new digitized voice reference pattern more likely to match the operator's verbal command.

In one preferred embodiment of an apparatus 10 according to the present invention and shown for example in FIGS. 1-3, the apparel manufacture equipment, such as sewing machine 12 for example, further comprises an electric motor 42. Electric motor 42 is configured to control specific operational modes of sewing machine 12. For instance, electric motor 42 may control the speed of sewing machine 12 and other various functions performed by sewing machine 12.

Electric motor 42 further comprises control circuitry 44 that is compatible with the interfacing means and configured to receive and act upon the digital control signals from speech recognition computer 14, thereby directing electric motor 42 to perform a task according to an operator's verbal command. In a most common example of the present state of the art of apparel manufacture devices, an operator controls the device by imparting signals via a foot pedal or similar device to control circuitry of an electric motor. The signals from the foot pedal cause contacts in the electric motor control circuitry to make or break depending upon the actual signal received. The control circuitry in turn controls the operation of the electric motor and causes the machine to operate accordingly.

The operation and method of the present invention will now be explained. Referring in detail to the embodiment of FIG. 1, external computer 34, a personal computer, is provided whereby the operator initially trains speech recognition computer 14 to create a library of digitized voice reference patterns particular to that individual operator. The operator interfaces speech recognition computer 14 with external computer 34 and downloads his library of digitized voice reference patterns, which are stored in external computer 34, to the storing means of speech recognition computer 14. This operation must be completed before apparatus 10 will respond to the operator's verbal commands. Still referring to FIG. 1, an operator wearing headset 22 inputs, as by speaking, a verbal command into microphone 20. The microphone sends an electrical signal representing this verbal command via cable 21 to speech recognition computer 14. Computer 14 converts this electrical signal into a digitized signal representing this verbal command. The accessing means of computer 14 compares the digitized signal representing this verbal command to the operator-specific digitized voice reference patterns stored in its library. If the comparison results in a match, speech recognition computer 14 recognizes and accepts the speech pattern of the operator. Speech recognition computer 14 then accesses the particular digital control signal corresponding to the matched digitized voice reference pattern and sends it to its output port. The signal is transmitted from the output port through an interfacing means, in this embodiment cable 18, to an apparel manufacture equipment, in this embodiment sewing machine 12. If necessary, the interfacing means can further include relay box 19 to modify the control signal from speech recognition computer 14 into a form accepted by and actable upon by sewing machine 12. The control signal is routed via the interfacing means to control circuitry 44 of electric motor 42. Control circuitry 44 responds to the digital control signal by directing electric motor 42 to change its operational state and thereby causing sewing machine 12 to perform a desired function.

The present invention provides an apparatus and method whereby an operator can control various functions of the apparel manufacture equipment by simply speaking a verbal command into the apparatus of the present invention, which translates the verbal command into a digital control signal and passes this signal to the apparel manufacture equipment in a form that is recognized by the equipment. The equipment then responds to this signal and performs the desired task. The voice control apparatus of this invention interfaces between the operator and the equipment without imposing any physical restraints or requirements upon the operator as a prerequisite to being able to operate and control the equipment. The operator is free to assume any stance or posture with which he is comfortable. Providing for this degree of physical mobility will prove extremely beneficial to both the operators and their employers.

Additionally, the present invention also allows one operator to control the operation of more than one type of machine. Presently, the general rule is that one operator works with one type of machine only since, as discussed above, that operator must be trained to physically or manually control the operation of the machine. The present invention provides means for an operator to communicate with any number of machines by simply inputting a voice command to those machines. Thus, it is feasible that far fewer employees will be needed to operate and control a far greater number of machines.

Also, the present invention requires very little in the way of physical skill, coordination, or aptitude from an operator. For example, a physically disabled person (for instance a wheelchair-bound person) could be employed to operate a voice controlled apparel manufacture device according to this invention, whereas previously such a person would be unable to function at this position. As long as a person could visually observe the operation of the machine and be able to speak verbal commands to control the machine, such a person would be a productive employee.

Also, the voice control method of this invention may reduce the amount of training needed by employees. A new employee could be trained in a relatively short time period. The employee need only learn the proper verbal commands and how to train the machine to accept his commands.

The present invention addresses the ergonomic related physical problems caused by the conventional apparel manufacture control methods and also provides apparatus and method allowing a far less skilled employee (both mentally and physically) to contribute as productive employees in this industry.

What is claimed is:

1. Apparel manufacturing system wherein an operator controls specific operations of an apparel manufacturing machine through verbal commands recognized by the system as distinct from other sounds in the environment of the system, the system comprising:

an apparel manufacturing device;
a recognizing and translating device, said recognizing and translating device configured to recognize the verbal command of the operator and to translate the verbal command into a digital control signal wherein said digital control signal includes an identification code corresponding to said apparel manufacturing device;
an input device, said input device being configured to input an operator's verbal command into said recognizing and translating device;
an interface device configured for presenting a digital control signal received from said recognizing and translating device to said apparel manufacturing device in a form recognized and accepted by said apparel manufacturing device, said recognizing and translating device being non-dependent on feedback signals indicating the actual operating condition of said apparel manufacturing device; and
an infrared light linkage configured for connecting said interface device in communication with said recognizing and translating device.

2. System as in claim 1, wherein said recognizing and translating device comprises a speech recognition computer.

3. System as in claim 2, wherein said speech recognition computer further comprises:

means for creating a library of operator-specific digitized voice reference patterns correlating to a set of specific digital control signals;
means for storing said library of operator-specific digitized voice reference patterns; and
means for comparing an operator's verbal command with said library of stored digitized voice reference patterns and for accessing the digital control signal corresponding to the stored digitized voice reference pattern matching the operator's specific verbal command, said comparing and accessing means being connected in communication with said storing means and said interface device.

4. System as in claim 3 further comprising means for training said speech recognition computer to operate with a specific individual operator.

5. System as in claim 4, wherein said means for training comprises an external computer interfaceable with said speech recognition computer, said external computer being configured to allow the operator to communicate with and train said speech recognition computer to create said library of operator-specific digitized voice reference patterns.

6. The system as in claim 4, wherein said speech recognition computer comprises said training means, said training means being configured to allow the operator to communicate with and train said speech recognition computer to create and edit said library of operator-specific voice reference patterns.

7. System as in claim 1, wherein said apparel manufacturing device further comprises an electric motor configured to control specific operational modes of said apparel manufacturing device, said electric motor having control circuitry mateable with said interface device and being configured to receive and act upon said digital control signal thereby directing said electric motor to perform a task according to an operator's verbal command.

8. A speech recognition controlled sewing system, wherein an operator controls specific operations performable by said sewing system through verbal commands recognized by said sewing system as distinct from other sounds in the environment of said sewing system, comprising:

a sewing machine capable of performing a desired sewing task;

an electric motor connected to power the operation of said sewing machine;

electric motor control circuitry connected to said electric motor for controlling the operation of said electric motor;

a speech recognition computer for recognizing and translating a verbal command into a digital control signal accepted by and actable upon by said electric motor control circuitry wherein said digital control signal includes an identification code corresponding to at least said sewing machine, said speech recognition computer further comprising:

means for creating a library of operator-specific digitized voice reference patterns correlating to a set of specific digital control signals;

means for storing said library of operator-specific digitized voice reference patterns; and means for comparing an operator's verbal command with said library of stored digitized voice reference patterns and for accessing the digital control signal corresponding to the stored digitized voice reference pattern matching said operator's specific verbal command, said comparing and accessing means being connected in communication with said storing means and said electric motor control circuitry;

a microphone for inputting an operator's verbal command into said speech recognition computer;

an interface device for presenting the digital control signal to said electric motor control circuitry, said interface device being configured to connect said speech recognition computer into communication with and said electric motor control circuitry, said speech recognition computer being non-dependant on feedback signals indicating the actual operating condition of said serving machine; and an infrared light linkage configured to connect said interface device in communication with said speech recognition computer.

9. Control apparatus for operating at least one apparel manufacturing machine having machine control circuitry for controlling specific machine operations wherein an operator controls specific machine operations through verbal commands recognized by the control apparatus as distinct from other sounds in the environment of the machine, said control apparatus comprising:

a receiver for receiving an operator's verbal command and converting said verbal command into an electronic verbal command;

means for digitizing said electronic verbal command;

means for comparing said digitized verbal command to a library of stored operator specific digitized voice reference patterns and macro definition voice reference patterns and for retrieving one of a digital control signal and a control signal sequence corresponding to one of a stored digitized voice reference pattern and a macro definition voice reference pattern, respectively, matching said digitized verbal command whereby only a particular operator whose digitized verbal command matches said stored digitized voice reference patterns can operate the at least one apparel manufacturing machine; and an interface device operably disposed between the machine control circuitry and said comparing and retrieving means, said interface device being configured to translate said digital control signals into signals recognized by the machine control circuitry for controlling the at least one operation of the apparel manufacturing machine.

10. Apparatus as in claim 9, further comprising means for recording the sequence, comprising order and timing, of a series of digitized voice reference patterns selected by said comparing and retrieving means and storing instructions capable of executing said sequence in association with a macro definition voice reference pattern.

11. Apparatus as in claim 10, wherein said comparing and retrieving means is configured to select said digitized voice reference pattern sequence upon matching said macro definition voice reference pattern to said digitized verbal command.

12. Apparatus as in claim 10, wherein said recording means is activated upon the matching by said comparing means of said operator's verbal command to a digitized learn mode reference pattern stored in said library.

13. Apparatus as in claim 9, further comprising means for recording the sequence, comprising order and timing, of a series of digital control signals selected by said comparing and retrieving means and storing instructions capable of executing said sequence in association with a macro definition voice reference pattern.

14. Apparatus as in claim 13, wherein said comparing and retrieving means is configured to select said digital control signal sequence upon matching said macro definition voice reference pattern to said digitized verbal command.

15. Apparatus as in claim 9, wherein said digitizing means and said comparing and retrieving means comprise a speech recognition computer.

16. Apparatus as in claim 15, further comprising: a storage medium for storing said library, and means for interfacing with said speech recognition computer to create said stored library of operator specific digitized voice reference patterns and macro definition voice reference patterns.

17. Apparatus as in claim 16, wherein said interfacing means comprises an external computer interfaceable with said speech recognition computer, said external computer being configured to allow the operator to communicate with and train said speech recognition computer to create said library of operator specific digitized voice reference patterns and macro definition voice reference patterns.

18. The apparatus as in claim 16, wherein said speech recognition computer comprises said interfacing means, said interfacing means being configured to allow the operator to communicate with and train said speech recognition computer to create and edit said library of operator-specific voice reference patterns and macro definition voice reference patterns.

19. The apparatus as in claim 9, wherein said comparing and retrieving means further comprises a means for editing said library of operator-specific voice reference patterns and macro definition voice reference patterns.

20. Control apparatus for operating at least one apparel manufacturing machines having machine control circuitry for controlling specific machine operations wherein an operator controls specific machine operations through verbal commands recognized by the control apparatus as distinct from other sounds in the environment of the machine, said control apparatus comprising:

a receiver for receiving an operator's verbal command and converting said verbal command into an electronic verbal command; and a speech recognition mechanism in operative communication with said receiver to digitize said electronic verbal command, to compare said digitized verbal command to a library of stored operator specific digitized voice reference patterns, to retrieve the digital control signal corresponding to a stored digitized voice reference pattern matching said digitized verbal command whereby only a particular operator whose digitized verbal command matches said stored digitized voice reference patterns can operate said at least one apparel manufacturing machine, and to calibrate at least one environment-dependent operating parameter of the control apparatus, wherein said speech recognition mechanism is non-dependent on feedback signals indicating the actual operating condition of the at least one apparel manufacturing machine.

21. The control apparatus as in claim 20, further comprising an interface device, said interface device being operably disposed between said machine control circuitry and said speech recognition mechanism, said interface device translating said digital control signals into signals recognized by the machine control circuitry for controlling the operation of the apparel manufacturing machine.

22. Apparatus as in claim 20 wherein said calibrating means is activated by said operator.

23. Apparatus as in claim 20 wherein said speech recognition mechanism is configured to elicit a response from said operator in the form of at least one verbal command corresponding to a said stored digitized voice reference pattern and to calibrate a said operating parameter based upon the variance between said response from said operator and said corresponding stored digitized voice reference pattern.

24. Apparatus as in claim 20 wherein at least one said parameter comprises a recognition threshold defining the degree of similarity between said digitized verbal command and said stored digitized voice reference pattern required before said speech recognition mechanism recognizes a match.

25. Apparatus as in claim 20 wherein at least one said parameter comprises a delta score defining the minimum difference between the similarity of said digitized verbal command to a first stored digitized voice reference pattern and the similarity of said digitized verbal command to any second stored digitized voice reference pattern permitted before said speech recognition mechanism recognizes a match between said digitized verbal command and said first stored digitized voice reference pattern.

26. Apparatus as in claim 20 wherein at least one said parameter comprises the gain applied to said digitized verbal command.

27. Apparatus as in claim 20, wherein said speech recognition mechanism comprises a speech recognition computer.

28. A speech recognition controlled apparel manufacturing system, wherein an operator controls specific operations performable by an apparel manufacturing machine through verbal commands recognized by said apparel manufacturing machine as distinct from other sounds in the environment of the apparel manufacturing machine, comprising:

an apparel manufacturing machine capable of performing a desired apparel manufacturing task;

a motor configured to power the operation of said apparel manufacturing machine;

motor control circuitry connected to said motor and configured to control the operation of said motor;

a speech recognition computer for recognizing and translating a verbal command into one of a digital control signal, a digital control signal sequence, and a digitized learn mode reference pattern, each of said digital control signals being configured to be accepted by and actable upon by said motor control circuitry wherein each said digital control signal additionally comprises an identification code corresponding to certain said apparel manufacturing machines, said speech recognition computer further comprising:

means for creating a library of operator-specific digital voice reference patterns corresponding to a set of digital control signals and macro definition voice reference patterns corresponding to a macro memory position, means for storing said library of operator-specific digital voice reference patterns and macro definition voice reference patterns, means for comparing an operator's verbal command with said library of stored digitized voice reference patterns and macro definition voice reference patterns and for accessing one of a said digital control signal and a said digital control signal sequence corresponding to one of a said stored digitized voice reference pattern and a said macro definition voice reference pattern, respectively, matching the operator's specific verbal command, means for recording the sequence, comprising order and timing, of a series of digital control signals selected by said speech recognition computer and storing instructions capable of executing said sequence in association with said macro definition voice reference pattern and whereby said speech recognition computer is capable of selecting said digital control signal sequence upon matching said macro definition voice reference pattern to said digitized voice reference pattern, and means for calibrating environment-dependent operating parameters, used in matching the operator's verbal commands to said stored digitized voice reference patterns, in response to the operator's prompted verbal commands to accommodate changed ambient environments;

a microphone for inputting the operator's verbal command into said speech recognition computer;

an interface device for presenting a control signal, corresponding to said digital control signal, to said electric motor control circuitry, said interface device being connected in communication with said electric motor control circuitry; and an infrared light linkage for connecting said interface device in communication with said speech recognition computer.

29. The speech recognition controlled apparel manufacturing system as in claim 28, wherein said calibrating means is configured to elicit a response from said operator in the form of at least one verbal command corresponding to a said stored digitized voice reference pattern and to calibrate a said operating parameter based upon the variance between said response from said operator and said corresponding stored digitized voice reference pattern.

30. The system as in claim 28, wherein said speech recognition computer further comprises a means for editing said library of operator-specific voice reference patterns and macro definition voice reference patterns.

31. A method for voice control of apparel manufacturing equipment, said method comprising the steps of:

creating and storing a library of operator specific digitized voice reference patterns;

receiving an operator's verbal command;

translating said verbal command into a digitized verbal command;

comparing the digitized verbal command to said library of operator specific digitized voice reference patterns;

retrieving the digital control signal corresponding to the digitized voice reference pattern matching the digitized verbal command; and routing the digital control signal to said apparel manufacturing equipment by an infrared light linkage, wherein said method does not depend on receiving signals or external input indicating the actual operating status of the apparel manufacturing equipment.

32. The method as in claim 31, further comprising the step of using an interfacing device disposed between said infrared light linkage and said apparel manufacturing equipment to modify said digital control signal into a form recognized and actable upon by said apparel manufacturing equipment.

33. A method for voice control of apparel manufacturing equipment, said method comprising the steps of:

creating and storing a library of operator specific digitized voice reference patterns and macro definition voice reference patterns;

receiving an operator's verbal command;

translating said verbal command into a digitized verbal command;

comparing the digitized verbal command to said library of operator specific digitized voice reference patterns and macro definition voice reference patterns;

retrieving one of a digital control signal and a digital control signal sequence corresponding to the one of a said digitized voice reference pattern and a said macro definition voice reference pattern matching said digitized verbal command; and routing said one of a digital control signal and a control signal sequence to the apparel manufacturing equipment.

34. The method as in claim 33, further comprising the steps of recording the sequence, comprising order and timing, of a series of digitized voice reference patterns corresponding to said retrieved digitized reference patterns and storing instructions, capable of executing said sequence, in association with said macro definition voice reference pattern.

35. The method as in claim 33, further comprising the steps of recording the sequence, comprising order and timing, of a series of said retrieved digital control signals and storing instructions, capable of executing said sequence, in association with said macro definition voice reference pattern.

36. The method as in claim 33, further comprising the step of selecting said digital control signal sequence upon matching said macro definition voice reference pattern to said digitized verbal command.

37. A method for voice control of apparel manufacturing equipment, said method comprising the steps of:

creating and storing a library of operator specific digitized voice reference patterns corresponding to respective different digital control signals;

receiving an operator's verbal command;

translating said verbal command into a digitized verbal command;

comparing said digitized verbal command to said library of operator specific digitized voice reference patterns;

retrieving from said library a digital control signal corresponding to the digitized voice reference pattern matching said digitized verbal command;

calibrating at least one environment-dependent operating parameter, used in matching said digitized voice reference patterns to said digitized verbal commands, whereby said at least one operating parameter is adjusted relative to a changed ambient environment; and routing said retrieved digital control signal to said apparel manufacturing equipment, wherein said method does not depend on receiving signals or external input indicating the actual operating status of the apparel manufacturing equipment.

38. The method as in claim 37, wherein said operator initiates said calibration step.

39. The method as in claim 37, further comprising the step of eliciting a response from said operator in the form of at least one verbal command corresponding to a said stored digitized voice reference pattern and calibrating said parameter based upon the variance between said response from said operator and said corresponding stored digitized voice reference pattern.

40. The method as in claim 37, wherein at least one said parameter comprises a recognition threshold defining the degree of similarity between said digitized verbal command and said stored digitized voice reference pattern required before said comparing and retrieving means recognizes a match.

41. The method as in claim 37 wherein at least one said parameter comprises a delta score defining the minimum difference between the similarity of said digitized verbal command to a first stored digitized voice reference pattern and the similarity of said digitized verbal command to any second stored digitized voice reference pattern permitted before said comparing and retrieving means recognizes a match between said digitized verbal command and said first stored digitized voice reference pattern.

42. The method as in claim 37, wherein at least one said parameter comprises the gain applied to said digitized verbal command.

43. A method for voice control of apparel manufacturing equipment, said method comprising the steps of:

creating and storing a library of operator specific digitized voice reference patterns corresponding to respective different digital control signals and macro definition voice reference patterns corresponding to respective different macro memory positions;

receiving an operator's verbal command;

translating said verbal command into a digitized verbal command;

matching said digitized verbal command to one of a said operator specific digitized voice reference pattern and a said macro definition voice reference pattern stored in said library;

retrieving from said library one of a said digital control signal and a digital control signal sequence corresponding to said matching one of a said digitized voice reference pattern and a said macro definition voice reference pattern, wherein said digital control signal sequences are stored in association with corresponding macro definition voice reference patterns and wherein a specific digital control signal sequence is selected upon matching one of said macro definition voice reference patterns to said digitized verbal command;

calibrating environment-dependent operating parameters, used in matching said digitized voice reference patterns to said digitized verbal commands, in response to an operator's elicited verbal commands whereby said operating parameters are adjusted relative to a changed ambient environment and wherein the operator is prompted to repeat certain of said verbal commands corresponding to stored digitized voice reference patterns and wherein said calibration is based upon the variance between the operator's responsive digitized verbal commands and corresponding said stored digitized voice reference patterns;

routing said one of said digital control signal and said digital control signal sequence to the apparel manufacturing equipment by an infrared light linkage; and modifying said digital control signal into a form recognized and actable upon by the apparel manufacturing equipment by means of an interfacing device configured to communicate between said infrared linkage and the apparel manufacturing equipment.

44. The method as in claim 43 further comprising the steps of recording the sequence, comprising order and timing, of a series of said retrieved digital control signals and storing instructions capable of executing said sequence in association with said macro definition voice reference pattern.

45. The method as in claim 44, wherein said recording step is initiated upon matching said digitized verbal command to a digitized learn mode reference pattern stored in said library.

* * * * *

UNITED STATES PATENT AND TRADEMARK OFFICE
CERTIFICATE OF CORRECTION

PATENT NO. : 5,748,843                                  Page 1 of 2
DATED      : May 5, 1998
INVENTOR(S): John C. Peck, Randy Rowland and Duanpei Wu It is certified that error appears in the above-identified patent and that said Letters Patent is hereby corrected as shown below:

Column 6, line 3, delete "8c" and insert therefor -- 8c1--;
line 3, after "is a" insert --partial--;
after line 4, insert
--Fig. 8c2 is a partial schematic representation of the decoding circuit of the infrared receiver as in Fig. 8a.
Fig. 8c3 is a partial schematic representation of the decoding circuit of the infrared receiver as in Fig. 8a.--;
line 7, delete "9" and insert therefor --9a--;
line 7, after "is a" insert --partial--; and
after line 9, insert
--Fig. 9b is a partial schematic representation of the infrared receiver and machine interface encompassed by the embodiment of the present invention as in Fig. 8a.
Fig. 9c is a partial schematic representation of the infrared receiver and machine interface encompassed by the embodiment of the present invention as in Figure 8a.--.
Column 15, line 26, delete "8c" and insert therefor --8c1 - 8c3--;
line 28, delete "8c" and insert therefor --8c1 - 8c3--;
line 30, delete "8c" and insert therefor --8c1 - 8c3--; and
line 40, delete "Fig. 8c" and insert therefor --Figs. 8c1 - 8c3--.

UNITED STATES PATENT AND TRADEMARK OFFICE
CERTIFICATE OF CORRECTION

Figure 9A:
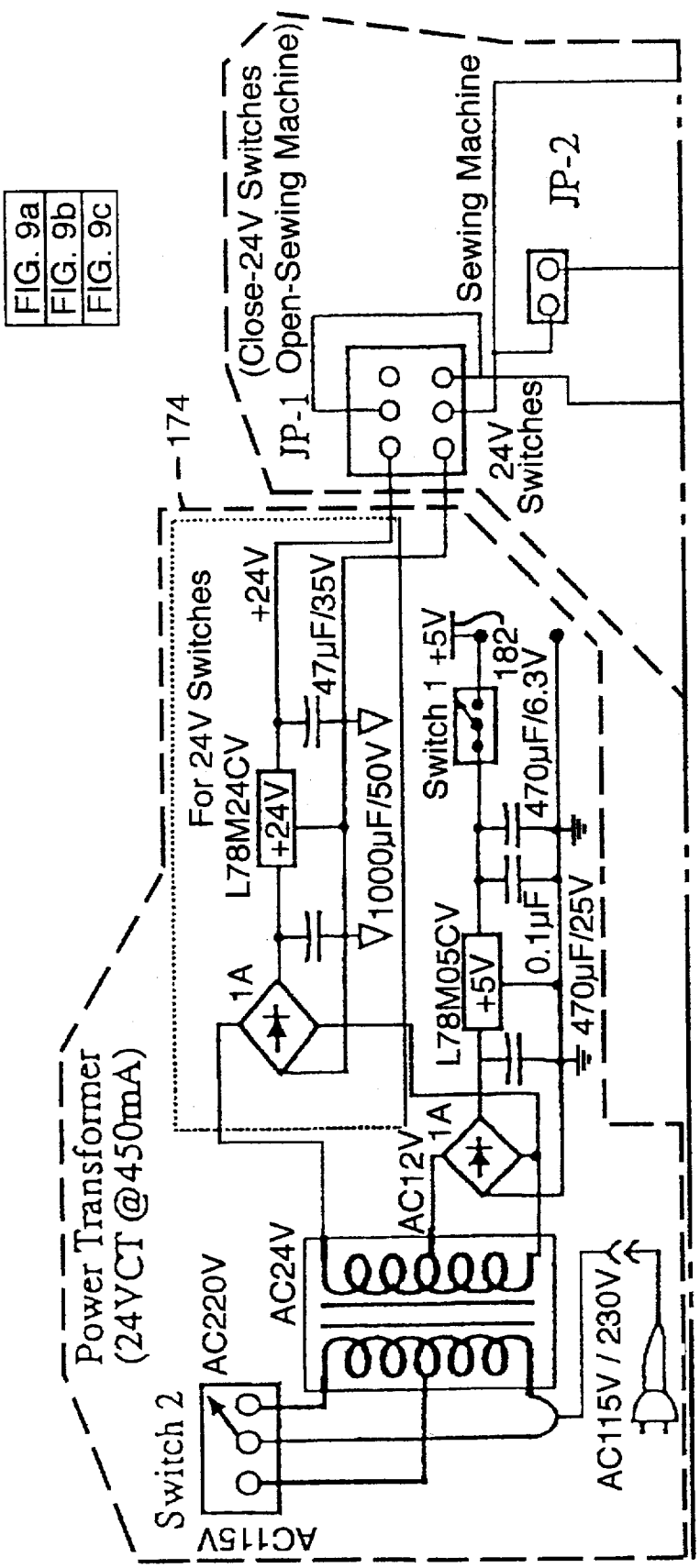
Figure 9B:
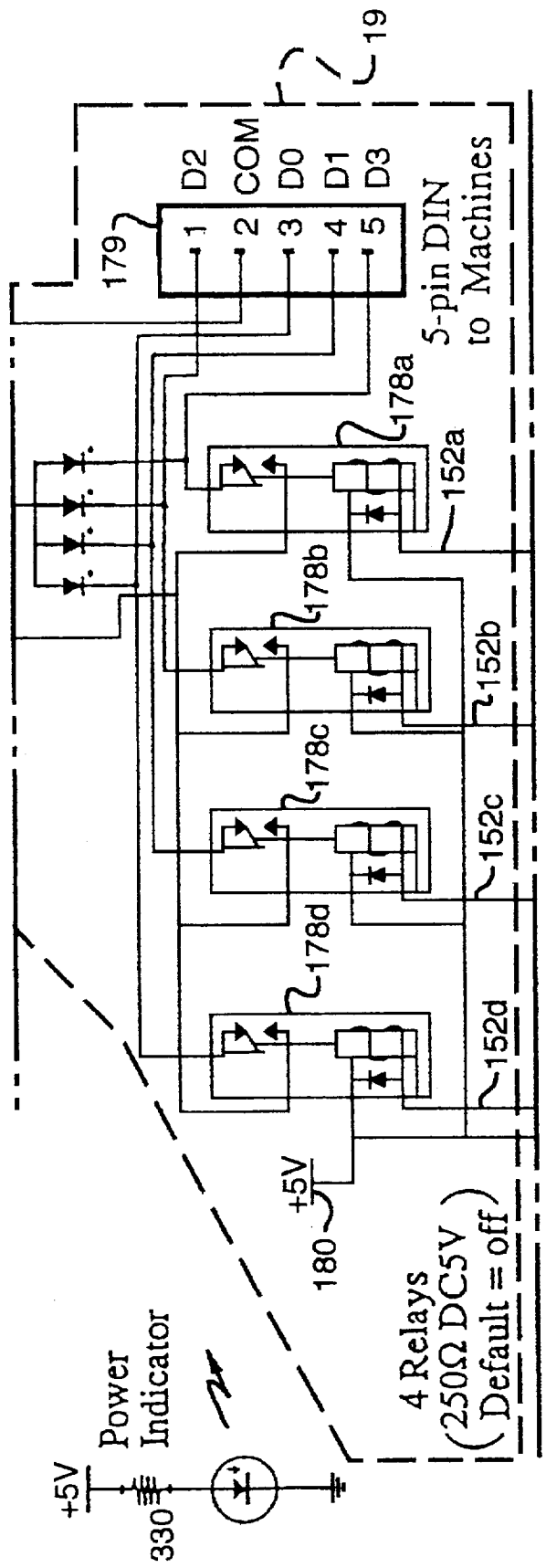
Figure 9C:
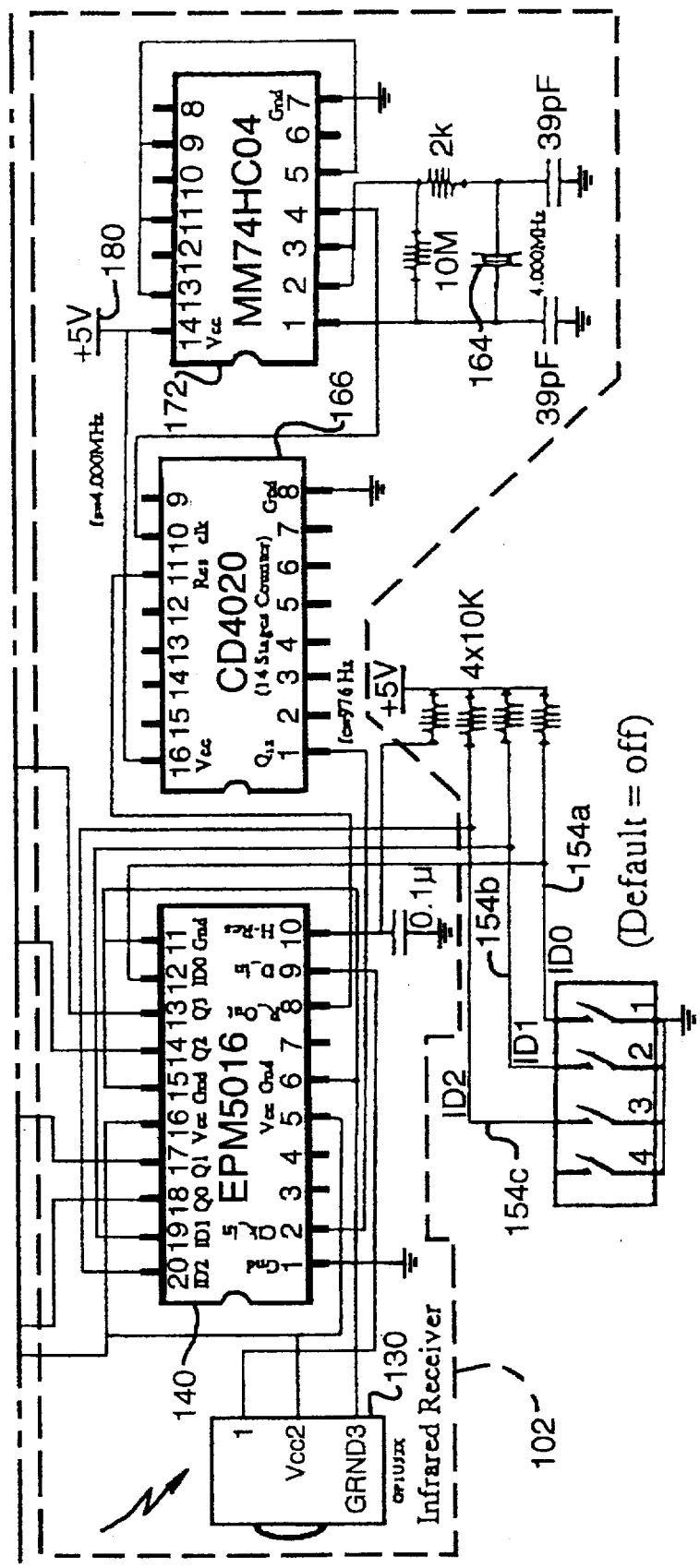

PATENT NO. : 5,748,843
DATED : May 5, 1998
INVENTOR(S) : John C. Peck, Randy Rowland and Duanpei Wu It is certified that error appears in the above-identified patent and that said Letters Patent is hereby corrected as shown below:

Column 16, line 15, delete "Fig. 9" and insert therefor --Figs. 9a - 9c--.
Line 28, delete "Fig. 9" and insert therefor --Figs. 9a - 9c--; and line 51, delete "Fig. 9" and insert therefor --Figs. 9a - 9c--.
line 58, delete "Fig. 8c" and insert therefor --Figs. 8c1 - 8c3--;and
Column 17, line 1, delete "Fig. 9" and insert therefor --Figs. 9a - 9c--.

Signed and Sealed this

Twenty-sixth Day of January, 1999

Attest:

Attesting Officer

Acting Commissioner of Patents and Trademarks